(12) United States Patent
Tsuruta

(10) Patent No.: US 7,926,782 B2
(45) Date of Patent: Apr. 19, 2011

(54) FLUID PRESSURE CONTROL DEVICE

(75) Inventor: Matsuhisa Tsuruta, Toyota (JP)

(73) Assignee: Advics Co., Ltd., Aichi-pref. (JP)

( * ) Notice: Subject to any disclaimer, the term of this patent is extended or adjusted under 35 U.S.C. 154(b) by 626 days.

(21) Appl. No.: 12/000,556

(22) Filed: Dec. 13, 2007

(65) Prior Publication Data

US 2008/0142750 A1 Jun. 19, 2008

(30) Foreign Application Priority Data

Dec. 15, 2006 (JP) ................................. 2006-338091
Jan. 15, 2007 (JP) ................................. 2007-005983
Jul. 3, 2007 (JP) ................................. 2007-175302

(51) Int. Cl.
*F16K 31/02* (2006.01)
(52) U.S. Cl. ................. 251/129.15; 137/884; 303/119.3
(58) Field of Classification Search ............. 251/129.15; 137/884; 303/119.1–119.3; 335/282, 278, 335/296, 299
See application file for complete search history.

(56) References Cited

U.S. PATENT DOCUMENTS

| | | | | |
|---|---|---|---|---|
| 4,898,360 A | * | 2/1990 | VonHayn et al. | 251/129.01 |
| 5,152,322 A | * | 10/1992 | Maas et al. | 137/884 |
| 5,449,019 A | * | 9/1995 | Hara | 137/596.17 |
| 5,452,948 A | * | 9/1995 | Cooper et al. | 303/119.3 |
| 5,462,344 A | * | 10/1995 | Jakob et al. | 303/119.3 |
| 5,474,108 A | * | 12/1995 | Inden et al. | 137/884 |
| 5,681,099 A | * | 10/1997 | Steffes et al. | 303/119.2 |
| 5,755,494 A | * | 5/1998 | Sekiguchi | 303/119.2 |
| 5,845,672 A | * | 12/1998 | Reuter et al. | 137/315.03 |
| 6,000,679 A | * | 12/1999 | Reuter et al. | 251/129.15 |
| 6,079,798 A | * | 6/2000 | Hosoya | 303/119.3 |
| 6,120,114 A | * | 9/2000 | Blazic et al. | 303/119.2 |
| 6,124,775 A | * | 9/2000 | Linkner, Jr. | 335/278 |
| 6,302,499 B1 | * | 10/2001 | Linkner et al. | 303/119.2 |
| 6,453,936 B1 | * | 9/2002 | Frank et al. | 137/315.03 |
| 6,598,944 B1 | * | 7/2003 | Wolff et al. | 303/119.2 |
| 6,688,904 B1 | * | 2/2004 | Schnalzger et al. | 439/404 |
| 6,786,466 B1 | * | 9/2004 | Risch et al. | 251/129.15 |
| 6,985,060 B2 | * | 1/2006 | Parker et al. | 335/282 |
| 2003/0010390 A1 | * | 1/2003 | Beck et al. | 137/884 |
| 2004/0004808 A1 | * | 1/2004 | Tsunooka et al. | 361/679 |
| 2004/0012257 A1 | * | 1/2004 | Jocham | 303/119.2 |
| 2005/0018390 A1 | * | 1/2005 | Sanada et al. | 361/679 |

FOREIGN PATENT DOCUMENTS

JP A-2002-368452 12/2002

* cited by examiner

Primary Examiner — John K Fristoe, Jr.
Assistant Examiner — Marina Tietjen
(74) Attorney, Agent, or Firm — Posz Law Group, PLC

(57) ABSTRACT

A solenoid of a solenoid valve is fixed to a body in direct contact with the body in which a fluid channel is formed. A board is fixed to the solenoid in direct contact with the solenoid.

9 Claims, 39 Drawing Sheets

FLUID PRESSURE CONTROL DEVICE

CROSS REFERENCE TO RELATED APPLICATION

This application is based on and incorporates herein by reference Japanese patent applications No. 2006-338091 filed on Dec. 15, 2006, No. 2007-005983 filed on Jan. 15, 2007, and No. 2007-175302 filed on Jul. 3, 2007.

FIELD OF THE INVENTION

The present invention relates to a fluid pressure control device which has a solenoid valve for opening and closing a fluid channel and has a board at which an electrical element is arranged. In particular, the present invention is suitable for a fluid pressure control device used for the vehicular brake device.

BACKGROUND OF THE INVENTION

A conventional fluid pressure control device shown in FIG. 48 includes a body 1 having a fluid channel through which brake fluid flows. As shown in FIG. 48, solenoid valves 2 for opening and closing a fluid channel are mounted on the body 1. The case 3 is formed by connecting a solenoid housing 32 and a connector housing 33 at a connecting portion 1A. The solenoid valves 2 respectively include solenoids 21 which are located in a solenoid chamber 2A formed by the solenoid housing 32.

A resin cover 3A is attached to the case 3 and forms a board chamber 4A. The board chamber 4A and the solenoid chamber 2A are separated from each other by a partitioning wall 5A of the case 3. A board 5 is located in the board chamber 4A and is supported by board holding members 6A of the case 3.

Solenoid terminals 22 of the solenoid valves 2 extends from the solenoid chamber 2A to the board chamber 4A, penetrating the partitioning wall 5A. The solenoid terminals 22 are accordingly connected with the board 5 by soldering. Ends of the connector terminals 4 formed by insert molding are attached to the board 5.

The case 3 and the cover 3A are welded together at an open end of the cover 3A. Seal members are inserted to portions of the partitioning walls which the solenoid terminals 22 penetrate. Thus, airtightness of the board chamber 4A is attained. A contacting surface between the body 1 and the case 3 are sealed by a packing 35 (See JP 2002-368452A).

In the above described fluid pressure control device, the solenoids 21 are fixed to the body 1 by caulking. However, another conventional fluid pressure control device is known in which the solenoids 21 are not fixed to the body 1. In such a fluid pressure control device, as shown in FIG. 49, the solenoids 21 are pushed by springs (waved washers) 7A located between the solenoid 21 and the body 1 and are accordingly pressed against stoppers 8A formed at the case 3. Thus, the solenoids 21 are properly positioned by the springs 7A and the stoppers 8A. Therefore, the solenoids 21 can be moved apart along with the case 3 from the body 1 when bolts fixing the case 3 to the body 1 are removed.

However, each of the conventional fluid pressure control devices includes the solenoid chamber 2A and board chamber 4A separately, and the partitioning wall 5A and the cover 3A are therefore necessary. This causes raise in manufacturing cost of the fluid pressure control device. The mount of the raise increases as the size of the fluid pressure control device increases.

In addition, a large amount of portions which need sealing causes rise in risk to the reliability of sealing of the fluid pressure control device as well as rise in the manufacturing cost of the fluid pressure control device.

In addition, in the conventional fluid pressure control device in which the solenoids 21 are fixed to the body 1 by caulking, the solenoids 21 are supported by members different from those for supporting the board 5. Besides, the board 5 is supported by the case 3, which has a linear coefficient of expansion larger than that of the body 1 supporting the solenoids 21. Therefore, heat load causes a difference in an amount of expansion between the case 3 and the body 1, which likely results in stresses causing solder cracking at connecting portions at which the solenoid terminals 22 are connected with the board 5 by soldering.

On the other hand, in the conventional fluid pressure control device in which the solenoids 21 are positioned by the stoppers 8A of the case 3, thermal expansion of the board holding portion 6A, the partitioning wall 5A, and the stoppers 8A under heat load increases distances from the solenoids 21 to the board 5. Therefore, stresses are generated at the connecting portions between the solenoid terminals 22 and the board 5, and solder cracking accordingly becomes likely to occur.

SUMMARY OF THE INVENTION

It is therefore an object of the present invention to reduce the size and the manufacturing cost of a fluid pressure control device. It is another object of the present invention to improve reliability of sealing of a fluid pressure control device. It is another object of the present invention to suppress cracking at a connecting portion between a terminal and a board.

According to an aspect of the present invention, a fluid pressure control device includes a body in which fluid flows; a solenoid valve for allowing and blocking flow of the fluid, the solenoid valve having a solenoid including a coil wire; a case in which an unpartitioned chamber is formed, the case installed to the body; a board located in the chamber, the board having a surface on which an electrical element is arranged; and a connector terminal connected with the board, the connector terminal to be connected with an external connector at an outside of the case.

In addition, the coil wire may be connected with the board directly or indirectly; the solenoid is fixed to the body in a co-moving manner; the board is fixed to and supported by the solenoid in a co-moving manner; and the solenoid and the board are located in the chamber.

The phrase "in a co-moving manner" is defined so that X is displaced by a disturbance (e.g. heat load) mainly in conjunction with the Y if X is related (e.g. fixed, connected, and the like) to Y in a co-moving manner.

With the above configuration, the fluid pressure control device can be made with a smaller size and lower cost, since a conventional partitioning wall and a conventional cover for covering the partitioning wall can be disused.

Since the partitioning wall is disused, it is not necessary to insert a seal member to a portion of the partitioning wall where the coil wire (otherwise, a member for electrically connecting the coil wire with the board) penetrates. Therefore, portions which need sealing decreases and sealing of the fluid pressure control device accordingly becomes more reliable.

In addition, the solenoid is fixed to the board in a co-moving manner. Therefore, when heat load causes expansion of the case, it is possible to reduce generation of a stress at a connection portion where the coil wire (otherwise, a member for electrically connecting the coil wire with the board) and board meet each other, compared to an instance that solenoid is fixed to a body and a board is fixed to a case. As a result, it is possible to suppress cracking at the connection portion.

The fluid pressure control device may further include a solenoid terminal which is stiffer than the coil wire, the solenoid terminal having an end connected with the coil wire and another end connected with the board. The solenoid terminal may be used so that the board is fixed to and supported by the solenoid in a co-moving manner.

Use of the solenoid terminal stiffer than the coil wire makes it possible to fix the board to the solenoid while allowing the fluid pressure control device to have a simpler structure.

The solenoid may include a bobbin and a first stay, the first stay integrally formed with the bobbin and the first stay protruding toward the board; and the first stay is used so that the solenoid is connected with the board.

Use of the first stay formed at the bobbin makes it possible to fix the board to the solenoid while allowing the fluid pressure control device to have a simpler structure.

The coil wire may extend along the first stay to the board and may be thereby connected with the board.

With the above configuration, it is possible to reduce the manufacturing cost of the fluid pressure control device compared to an instance that the solenoid terminal is used so the board is fixed to and supported by the solenoid in a co-moving manner, since the solenoid terminals can be disused.

The coil wire may be directly attached to the board, and the coil wire may be used so that the board is fixed to and supported by the solenoid in a co-moving manner.

With the above configuration, it is possible to reduce the manufacturing cost of the fluid pressure control device compared to an instance that the solenoid terminal is used to fix the board to the solenoid in a co-moving manner and to support the board with the solenoid, since the solenoid terminals can be disused.

The solenoid may include a guide portion integrally formed with the bobbin, the guide portion protruding toward the board and supporting the coil wire.

With this configuration, the guide portion reinforces a rising portion of the coil wire at which the coil wire starts rising toward the board.

The fluid pressure control device may further include a pillar fixed to the body, the pillar being in contact with the board and preventing the board getting closer to the body.

When the board is pressed against the body in mounting the board on the body with the solenoid interposed, the pillar with the above configuration being in contact with the board suppresses deformation of the board and/or put the board to a proper position with respect to the body.

In another aspect of the present invention, a fluid pressure control device includes: a body in which fluid flows; a solenoid valve including a valve unit and a solenoid, the valve unit allowing and blocking flow of the fluid, the solenoid including a coil wire, the solenoid being externally fitted to the valve unit in a detachable manner; a case in which an unpartitioned chamber is formed, the case installed to the body; a board located in the chamber, the board having a surface on which an electrical element is arranged; and a connector terminal connected with the board, the connector terminal to be connected with an external connector at an outside of the case.

In addition, the coil wire is connected with the board directly or indirectly; the solenoid is fixed to the board in a co-moving manner; the board is fixed to the case in a co-moving manner; the valve unit is fixed to the body in a co-moving manner; and the solenoid and the board are located in the chamber.

With the above configuration, the fluid pressure control device can be made with a smaller size and lower cost, since a conventional partitioning wall and a conventional cover for covering the partitioning wall can be disused.

Since the partitioning wall is disused, it is not necessary to insert a seal member to a portion of the partitioning wall where the coil wire (otherwise, a member for electrically connecting the coil wire with the board) penetrates. Therefore, portions which need sealing decreases and sealing of the fluid pressure control device accordingly becomes more reliable.

In addition, the solenoid is fixed to the board in a co-moving manner. Therefore, when heat load causes expansion of the case, it is possible to reduce generation of a stress at a connection portion where the coil wire (otherwise, a member for electrically connecting the coil wire with the board) and board meet each other, compared to an instance that solenoid is positioned by a stopper of a case. As a result, it is possible to suppress cracking at the connection portion.

The fluid pressure control device may further include: a second stay integrally formed with the case, the second stay protruding toward the board; and a solenoid terminal which is suffer than the coil wire, the solenoid terminal having an end connected with the coil wire and another end connected with the board. The second stay may used so that the board is connected with the case in a co-moving manner; and the solenoid terminal may be used so that the solenoid is fixed to the board in a co-moving manner.

Use of the solenoid terminal stiffer than the coil wire makes it possible to fix the solenoid to the board while allowing the fluid pressure control device to have a simpler structure.

The solenoid may include a bobbin and a first stay, the first stay integrally formed with the bobbin and the first stay protruding toward the board; the case may include a second stay integrally formed with the case, the second stay protruding toward the board; the first stay may be used so that the solenoid is connected with the board in a co-moving manner; and the second stay may be used so that the board is connected with the case in a co-moving manner.

Use of the first stay formed at the bobbin makes it possible to fix the board and the solenoid to the case while allowing the fluid pressure control device to have a simpler structure.

The coil wire may extend along the first stay to the board and may be thereby connected with the board.

With the above configuration, it is possible to reduce the manufacturing cost of the fluid pressure control device compared to an instance that the solenoid terminal is used to fix the solenoid to the board in a co-moving manner and to support the solenoid with the board, since the solenoid terminals can be disused.

The coil wire may be directly attached to the board, and the coil wire may be used so that the solenoid is fixed to and supported by the board in a co-moving manner.

With the above configuration, it is possible to reduce the manufacturing cost of the fluid pressure control device compared to an instance that the solenoid terminal is used the solenoid is fixed to and supported by the board in a co-moving manner, since the solenoid terminals can be disused.

The solenoid may include a guide portion integrally formed with the bobbin, the guide portion protruding toward the board and supporting the coil wire.

With this configuration, the guide portion reinforces a rising portion of the coil wire at which the coil wire starts rising toward the board.

The case may include a main unit and a cover portion, wherein the main unit is attached to the body and includes an open end formed at an end of the main unit farther from the body, and the cover portion covers the open end.

With the above configuration, if the cover portion is integrated with the main unit after the board, the connector terminal, and the like are connected together, the process of connecting can be easily performed.

The fluid pressure control device may be incorporated to a vehicle and used for a brake device of the vehicle.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

First Embodiment

Figure 1:
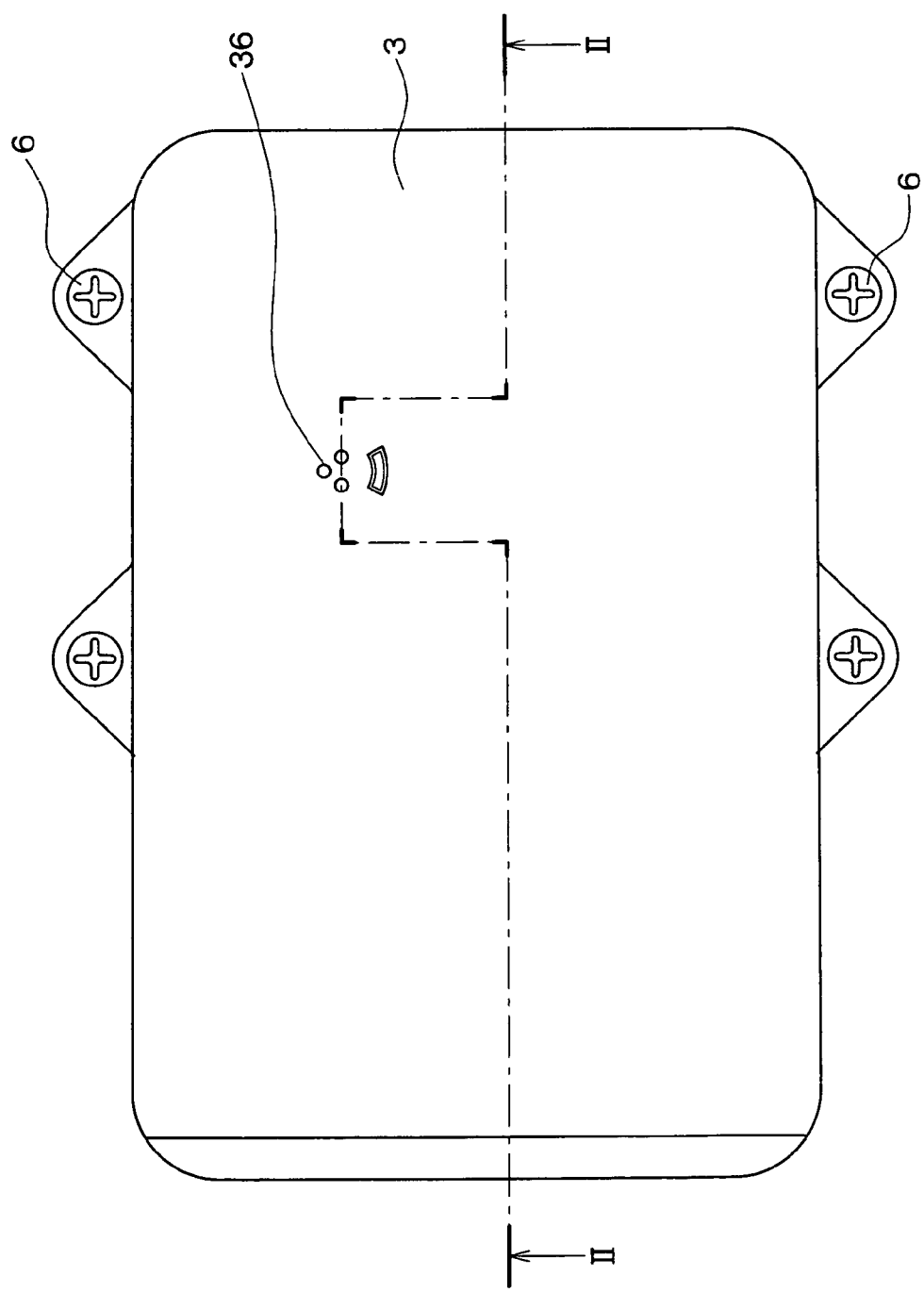
FIG. 1 is a front view of a fluid pressure control device according to a first embodiment.
Figure 2:
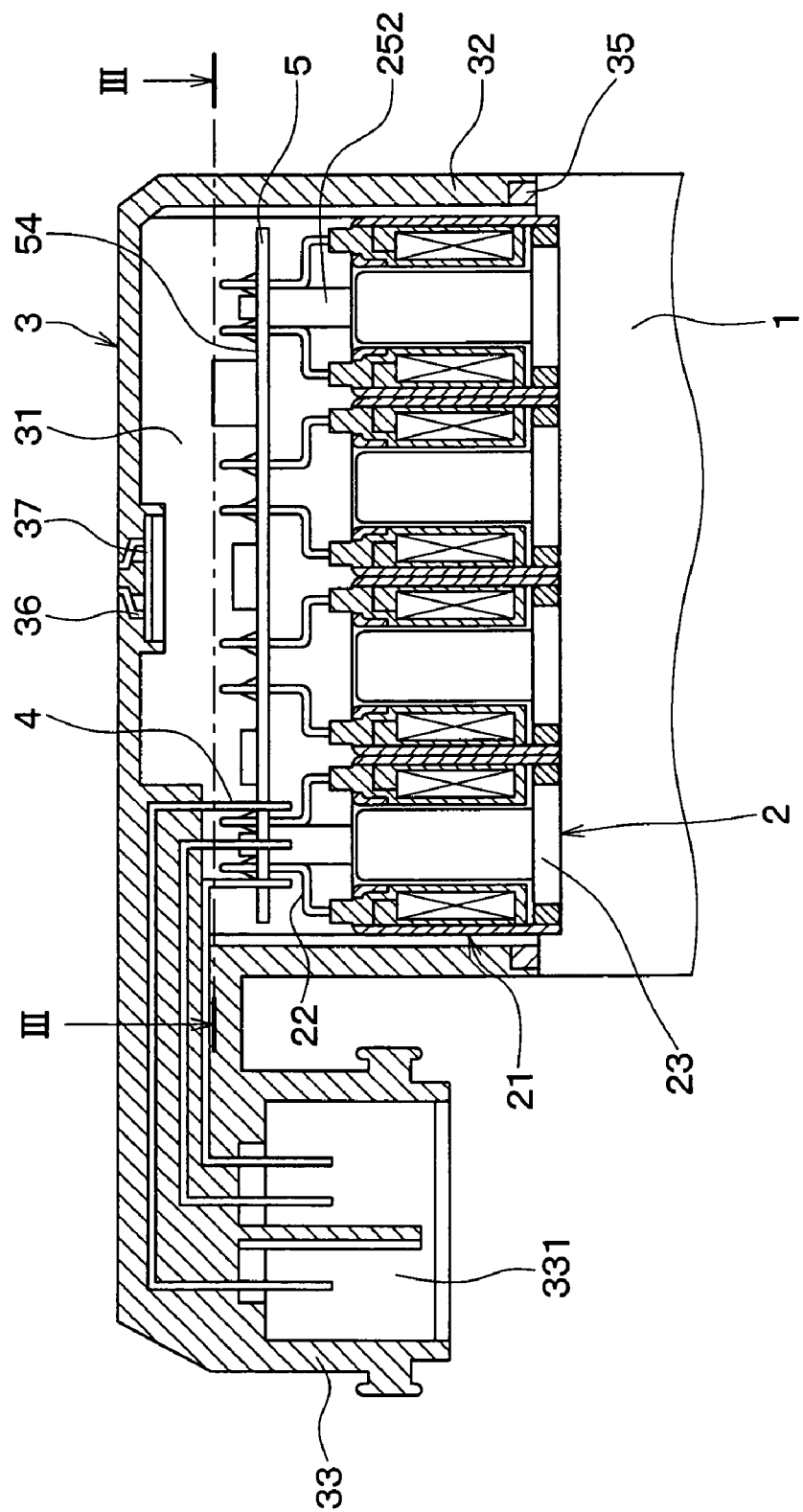
FIG. 2 is a cross-sectional view taken along the II-II line in FIG. 1.
Figure 3:
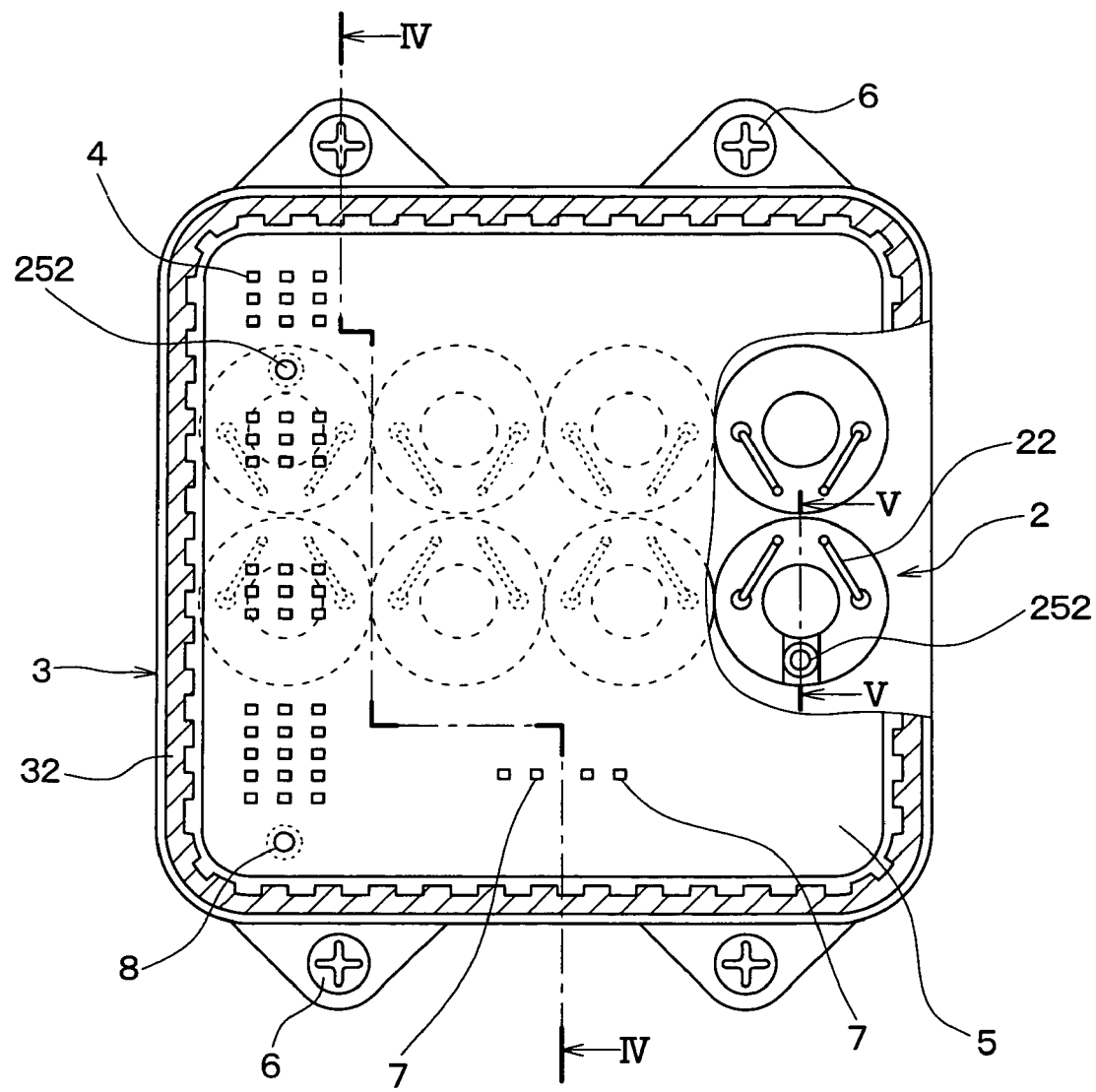
FIG. 3 is a cross-sectional view taken along the III-III line in FIG. 2.

Hereinafter, a first embodiment of the present invention is described with reference to FIGS. 1 to 6.

A fluid pressure control device of the present embodiment is used for a vehicular brake device which controls a brake fluid pressure to control a braking force of a vehicle. The upward direction and the downward direction in FIG. 1 correspond respectively to the upward direction and the downward direction with reference to the vehicle when the fluid pressure control device is installed to the vehicle.

As shown in FIGS. 1 to 4, the fluid pressure control device includes a metal body 1 having a fluid channel (not shown) through which brake fluid flows. A plurality of solenoid valves 2 for opening and closing the fluid channel to allow and block flow of the fluid, a pump (not shown) for sucking and discharging the brake fluid, and an electrical motor (not shown) for driving the pump are installed to the body 1.

Each of the solenoid valves 2 includes a valve unit 23 having a valve body (not shown) for opening and closing the fluid channel and also includes a solenoid 21 which draws the valve body on receiving an electrical current.

A resin case 3 is attached to a side face of the body 1 so that the case 3 covers the solenoids 21 and a board described below. Four metal bushes 34 and a lot of connector terminal 4 are formed in the case 3 through insert molding. The case 3 include a solenoid housing 32 and a connector housing 33, each having a shape similar to rectangular parallelepiped. The solenoid housing 32 forms an unpartitioned chamber 31 for accommodating the solenoids 21 and a plate-like board 5. The connector housing 33 forms a space 331 for accommodating an end of each of the connector terminals 4. When an external connector (not shown) is attached to the connector housing 33, connector terminals of the external connector are connected with the connector terminals 4 of the fluid pressure control device.

The case 3 is fixed to the body 1 at the bushes 34 by means of four screws 6. A surface at which the case 3 and the body 1 are contacted with each other is sealed with a packing 35.

A communicating hole 36 is formed at the case 3. The chamber 31 formed by the solenoid housing 32 communicates with the outside of the case 3 through the communicating hole 36. The communicating hole 36 prevents the chamber 31 from having a negative pressure. The communicating hole 36 is covered with a filter 37 through which gas can pass and fluid cannot pass.

Figure 6:
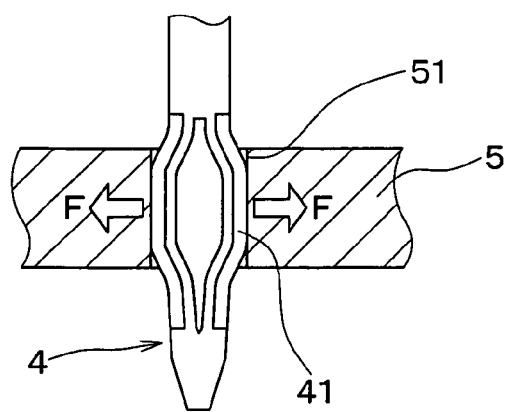
FIG. 6 is a cross-sectional view showing a portion at which a connector terminal and a board shown in FIG. 2 are connected.

Electric elements (not shown) are arranged on a surface 54 of the board 5 and connected with the other end of each of the connector terminals 4. As shown in FIG. 6, each of the connector terminals 4 includes a press fit pin which is fixed to the board 5 by press fitting. An insertion portion 41 which is inserted in an insertion hole 51 of the board 5 generates an expansion force F, since the insertion portion 41 is made to have a larger diameter than that of the insertion hole 51.

Figure 4:
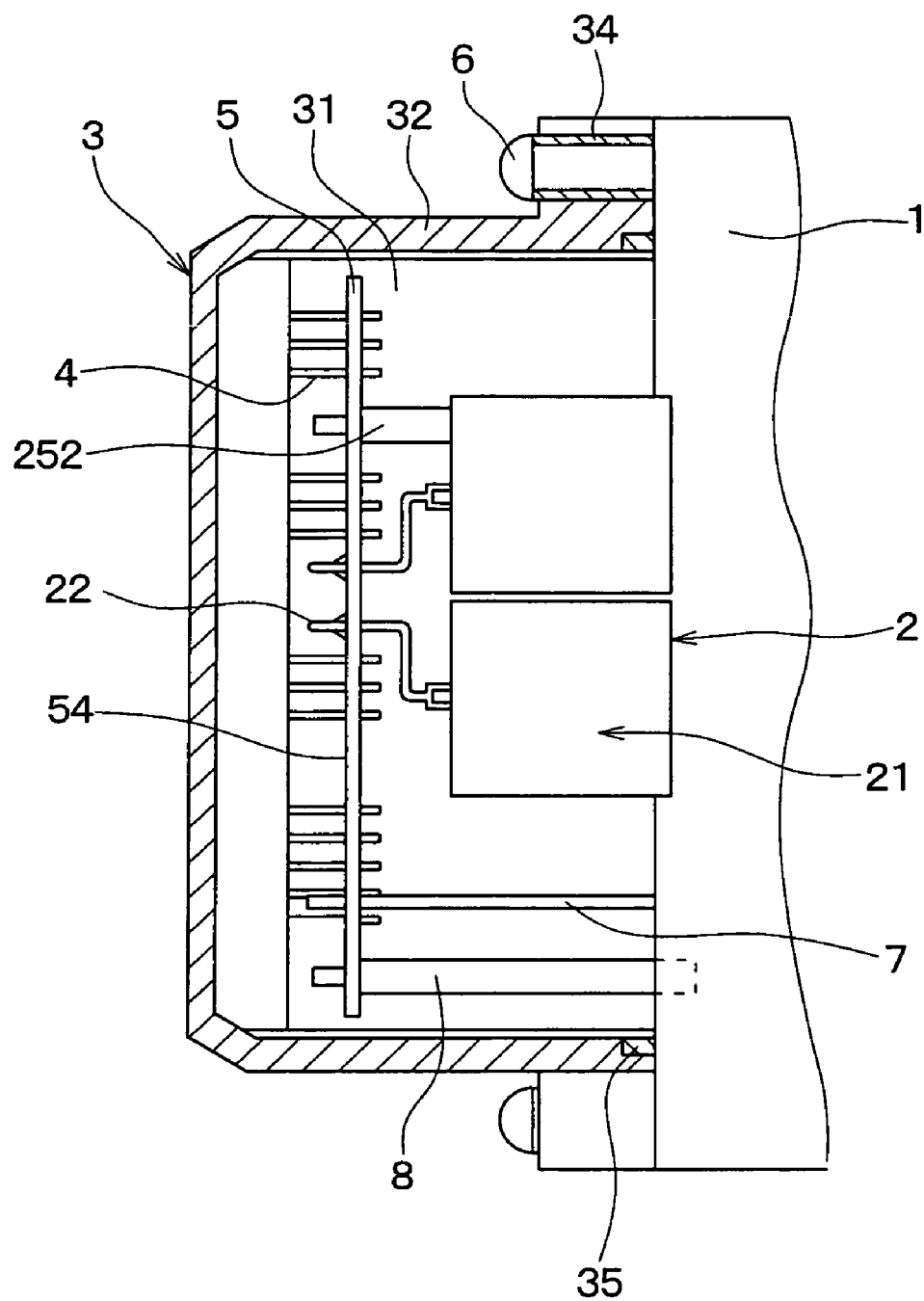
FIG. 4 is a cross-sectional view taken along the IV-IV line in FIG. 3.

As shown in FIG. 4, solenoid terminals 22 of the solenoid valves 2 and a terminal 7 of the electrical motor are connected with the board 5 by means of soldering or press fitting.

Figure 5:
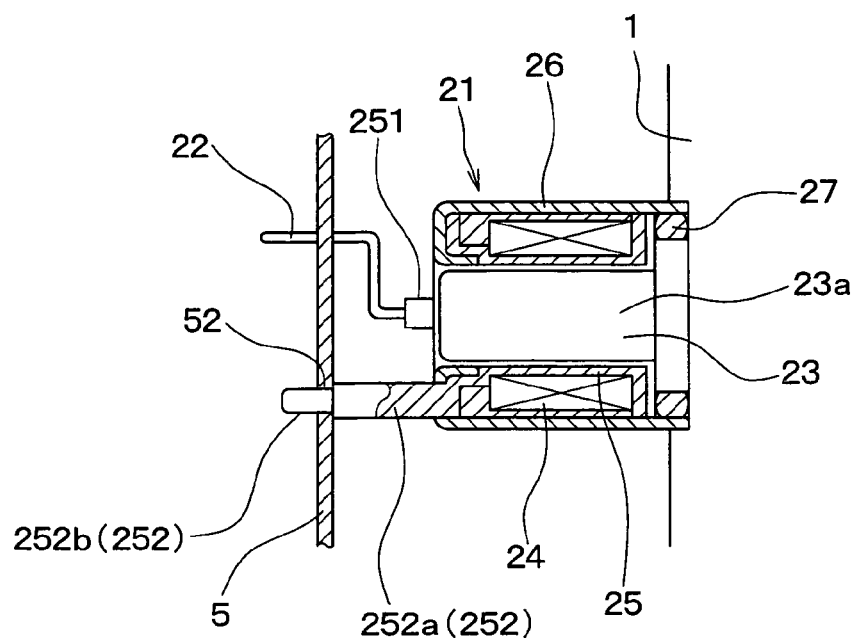
FIG. 5 is a cross-sectional view taken along the V-V line in FIG. 3.

Next, the solenoids 21 of the solenoid valves 2 are described with reference to FIG. 5. The most parts of the valve units 23 are located in the body 1. Each of the valve units 23 includes a sleeve 23a, which is made of non-magnetic metal and protrudes from the body 1. Each of the valve units 23 is fixed to the body 1 by means of caulking.

Each of the solenoids 21 also includes a coil wire 24, a resin bobbin 25, a cylindrical yoke 26 made of magnetic metal, a ring 27 made of magnetic metal. Each of the solenoids 21 is constructed by attaching the coil wire 24 to the bobbin 25, forming a periphery of the bobbin 25 through plastic molding, installing the bobbin 25 in the yoke 26, attaching the ring 27 to an opening at an end of the yoke 26, and connecting the coil wire 24 and the corresponding solenoid terminal 22 by means of soldering. Each of the solenoids 21 is fixed to the body 1 by engaging the solenoid 21 to the corresponding sleeve 23a and caulking the body 1.

In every one of all (eight in number in this instance) the solenoid valves 2, a terminal guide 251 for holding the corresponding solenoid terminal 22 is integrally formed with the bobbin 25 and holds the solenoid terminal 22. In some (in this embodiment, two) of the solenoid valves 2, a first stay 252 (sometimes referred to herein as a "solenoid stay") is integrally formed with the bobbin 25, protrudes towards the board 5, and thereby supports the board 5.

The first stay 252 includes a large diameter pillar 252a protruding toward the board 5 and a small diameter pillar 252b protruding from an end of the large diameter pillar 252a towards the board 5. The diameter of the large diameter pillar 252a is sufficiently larger than that of a stay insertion hole 52 to which the first stay 252 is inserted. In contrast, the diameter of the small diameter pillar 252b is smaller than that of the large diameter pillar 252a and is slightly larger than that of the stay insertion hole 52. The small diameter pillar 252b is press fitted into the stay insertion hole 52 so that the solenoid 21 is connected with the board 5 in direct contact and in a co-moving manner as a single body.

As shown in FIG. 4, a pillar 8 is press fitted at its one end into the body 1 and extends toward the board 5. The other end of the pillar 8 is inserted to a hole (not shown) formed at the board 5. Proper positioning of the board 5 relative to the body 1 in the direction of the diameters of the solenoid valves 2 is achieved by with the help of the a pillar 8. In addition, the pillar 8 has a stepped shape for preventing the board 5 from moving unnecessarily closer to the body 1.

The fluid pressure control device having the structure described above is constructed as follows. First, the solenoid valves 2, the pump and the motor and the like are installed to the body 1. At this time, the body 1 is caulked so that the solenoid 21 is fixed to the body 1 in direct contact with the body 1 in a co-moving manner as a single body.

Next, each of the first stays 252 of some of the solenoids 21 are press fitted into the stay insertion holes 52 of the board 5 having the electrical elements, so that the board 5 is fixed to these solenoids 21 in direct contact with these solenoids 21 in a co-moving manner as a single body. At this time, the pillar 8, the solenoid terminals 22, and the motor terminal 7 are inserted to the corresponding holes of the board 5.

Next, the case 3 is putted on the body 1 and then fixed to the body 1 with the solenoid 21 and the board 5 located in the chamber 31. At this time, the connector terminals 4 are inserted to the corresponding hole of the board 5.

In the case that the board 5 is attached to the solenoid 21, in other words, in the case that the board 5 is attached to the body 1 with the solenoid 21 interposed as well as in the case that the connector terminals 4 fare inserted to the corresponding holes of the board 5, the board 5 is pressed toward the body 1 (i.e. rightward in FIG. 4) At this time, according to the present embodiment, the board 5 comes in contact with a tip portion of the pillar 8 and deformation of the board 5 is accordingly suppressed. In addition, proper positioning of the board 5 relative to the body 1 is achieved.

According to the present embodiment, the solenoids 21 and the board 5 are located in the chamber 31. Therefore, a conventional partitioning wall and a conventional cover for covering the partitioning wall can be disused. As a result, the fluid pressure control device can be made with a smaller size and lower cost.

Accordingly, sealing of the fluid pressure control device becomes more reliable since portions which need sealing decreases.

In addition, some of the solenoids 21 are fixed to the board 5 in direct contact with the board 5 in a co-moving manner as a single body. Therefore, when heat load causes expansion of the case 3, it is possible to reduce generation of a stress at each of connection portions where the solenoid terminals 22 and board 5 meet each other, compared to the instance that solenoids are fixed to a body and a board is fixed to a case. As a result, it is possible to suppress cracking at the connection portions.

Second Embodiment

Hereinafter, a second embodiment of the present invention is described with reference to FIGS. 7 to 9. A part shown in this embodiment is identical or equivalent to a part in the first embodiment if the same reference numeral is applied to the two parts. Descriptions for such a part are omitted in this embodiment.

In the first embodiment, the solenoid 21 is fixed to the body 1 by means of caulking. In contrast, the solenoid 21 according to the present embodiment is not fixed to the body 1. More specifically, the solenoid 21 is externally fitted to the sleeve 23a of the valve unit 23 at the periphery of the sleeve 23a in a detachable manner. In addition, the pillar 8 used in the fluid pressure control device according to the first embodiment is disused in this embodiment.

Figure 7:
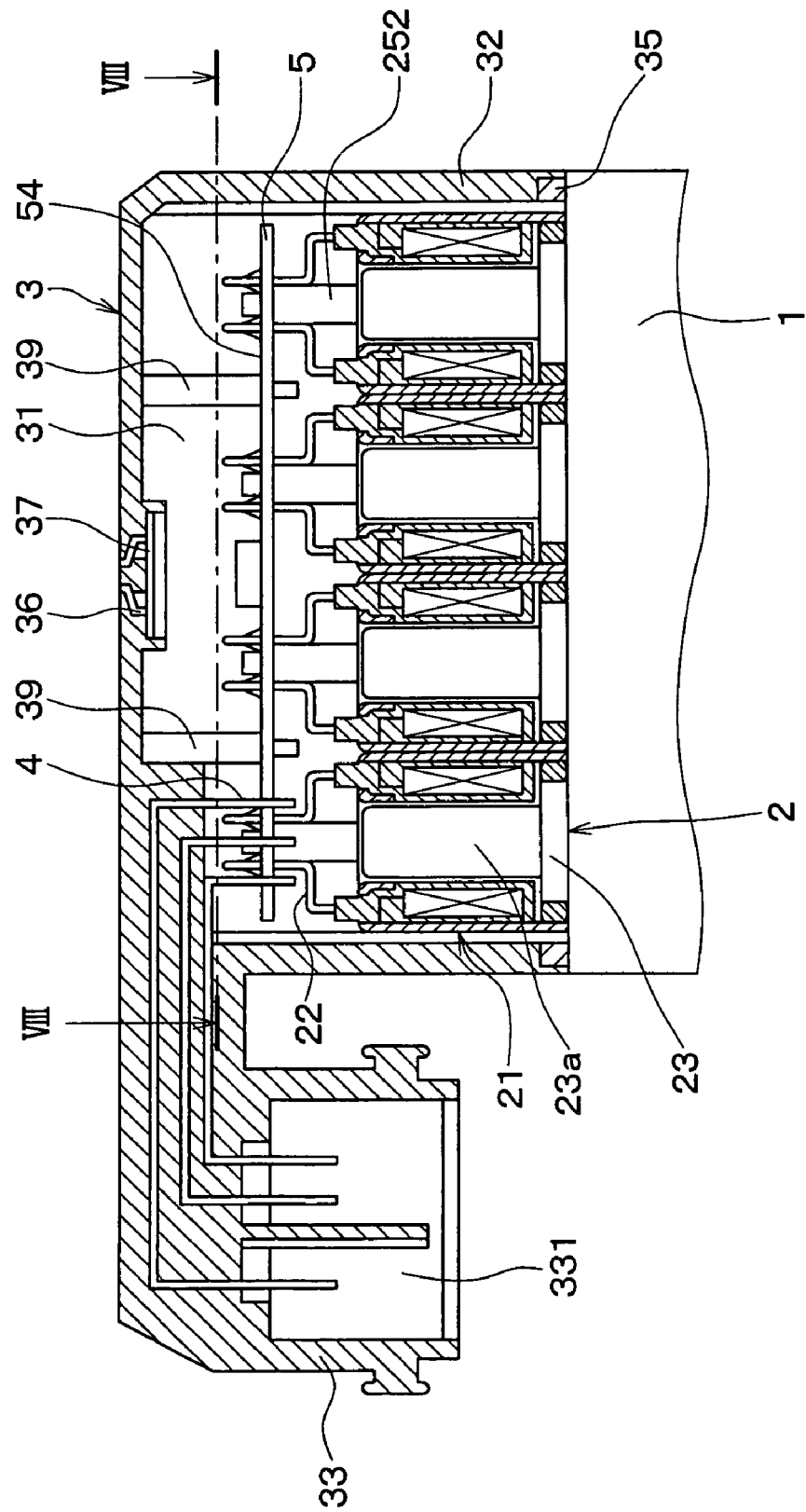
FIG. 7 is a cross-sectional view of a main part of a fluid pressure control device according to a second embodiment of the present invention.
Figure 8:
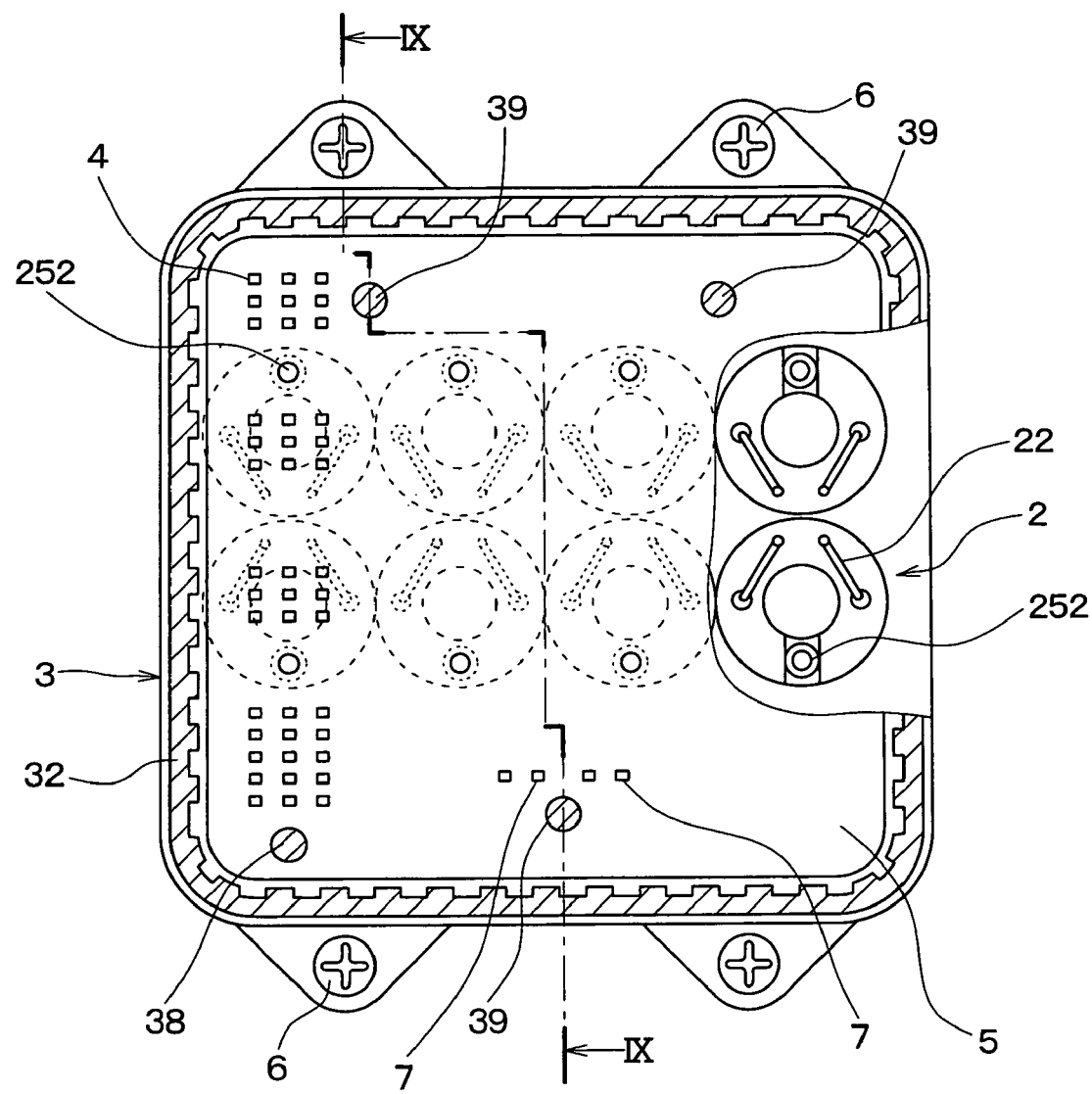
FIG. 8 is a cross-sectional view taken along the VIII-VIII line in FIG. 7.
Figure 9:
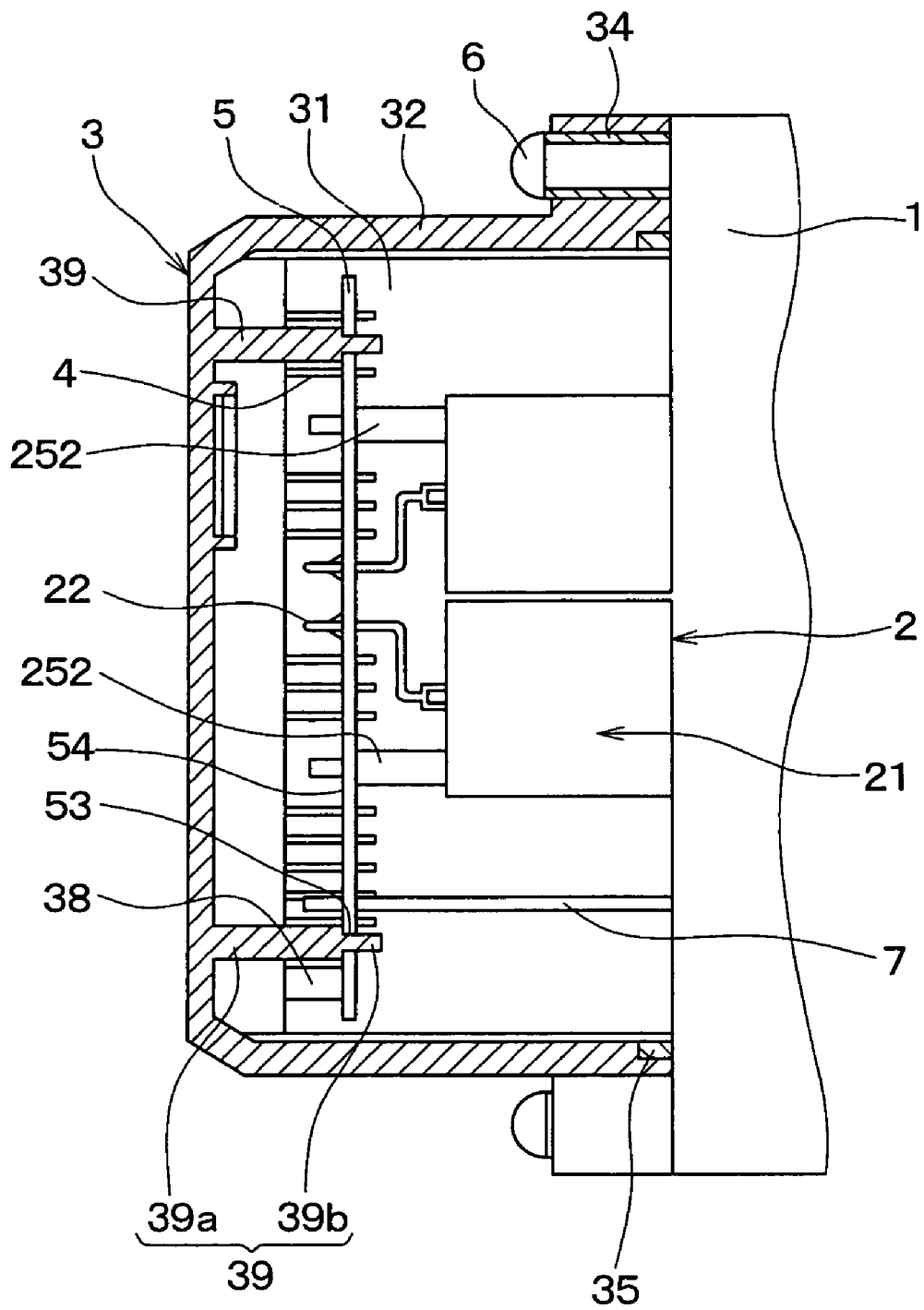
FIG. 9 is a cross-sectional view taken along the IX-IX line in FIG. 8.

As shown in FIGS. 7 to 9, in every one of all (eight in number in this instance) the solenoid valves 2, a first stay 252 is formed integrally with the corresponding bobbin 25. The first stays 252 are press fitted respectively into the stay insertion holes 52 (see FIG. 5) of the board 5, so that every one of all the solenoids 21 is connected with the board 5 in direct contact with the board 5 in a co-moving manner as a single body.

Second stays 39 (sometimes referred to herein as a "case stay" or "case stays") are formed integrally with the case 3 and protrude toward the board 5 from the opposite side of the board 5 relative to the solenoid valves 2. Each of the second stays 39 includes a large diameter pillar 39a protruding toward the board 5 and a small diameter pillar 39b protruding from an end of the large diameter pillar 39a towards the board 5. The diameter of each of the large diameter pillars 39a is sufficiently larger than that of one of stay insertion holes 53 to which the corresponding second stay 39 is inserted. In contrast, the diameter of each of the small diameter pillar 39b is smaller than that of the corresponding large diameter pillar 39a and is slightly larger than that of the corresponding stay insertion hole 53. Each of the small diameter pillar 39b is press fitted into the corresponding stay insertion hole 53 so that the case 3 is connected with the board 5 in direct contact with the board 5 in a co-moving manner as a single body.

The fluid pressure control device having the above structure is constructed as follows. First, the valve units 23 of the valves 2, the pump and the motor and the like are attached to the body 1. At this time, the body 1 is caulked so that the valve unit 23 is fixed to the body 1 in direct contact with the body 1.

In addition, the first stays 252 of the solenoids 21 are press fitted respectively into the stay insertion holes 52 of the board 5 at which the electrical elements are arranged. A board collective is accordingly formed in which the solenoids 21 are fixed to the board 5 in direct connection with the board 5 in a co-moving manner as a single body. Moreover, the second stays 39 of the case 3 are press fitted respectively into the stay insertion holes 53 of the board 5. Thus, the board 5 is fixed to the case 3 in direct contact with the case 3 in a co-moving manner as a single body, with the board collective located in the chamber 31.

Then, the case 3 accommodating the board collective is fixed to the body 1 by means of the screws 6. At this time, the solenoids 21 are externally fitted respectively to the sleeves 23a of the valve units 23 at the peripheries of the sleeves 23a.

In the case that the motor terminal 7 is connected with the board 5 with press fit, a stopper 38 may be located at the case 3 which bears the board 5 at a position close to the insertion hole for the motor terminal 7, so as to prevent the board 5 from being bent when the motor terminal 7 is press fitted to the board 5.

In this embodiment, all of the solenoids 21 and the board 5 are fixed with each other in direct contact in a co-moving manner as a single body. Therefore, when heat load causes expansion of the case 3, it is possible to reduce generation of a stress at each of connection portions where the solenoid terminals 22 and board 5 meets each other, compared to an instance that solenoids are positioned by means of a stopper of a case. As a result, it is possible to suppress cracking at the connection portion.

Third Embodiment

Hereinafter, a third embodiment of the present invention is described with reference to FIG. 10. In the present embodiment, the way in which the case 3 is fixed to the body 1 is different from those of the first embodiment and the second embodiment. A part shown in this embodiment is identical or equivalent to a part in the first or second embodiment if the same reference numeral is applied to the two parts. Descriptions for such a part are omitted in this embodiment.

Figure 10:
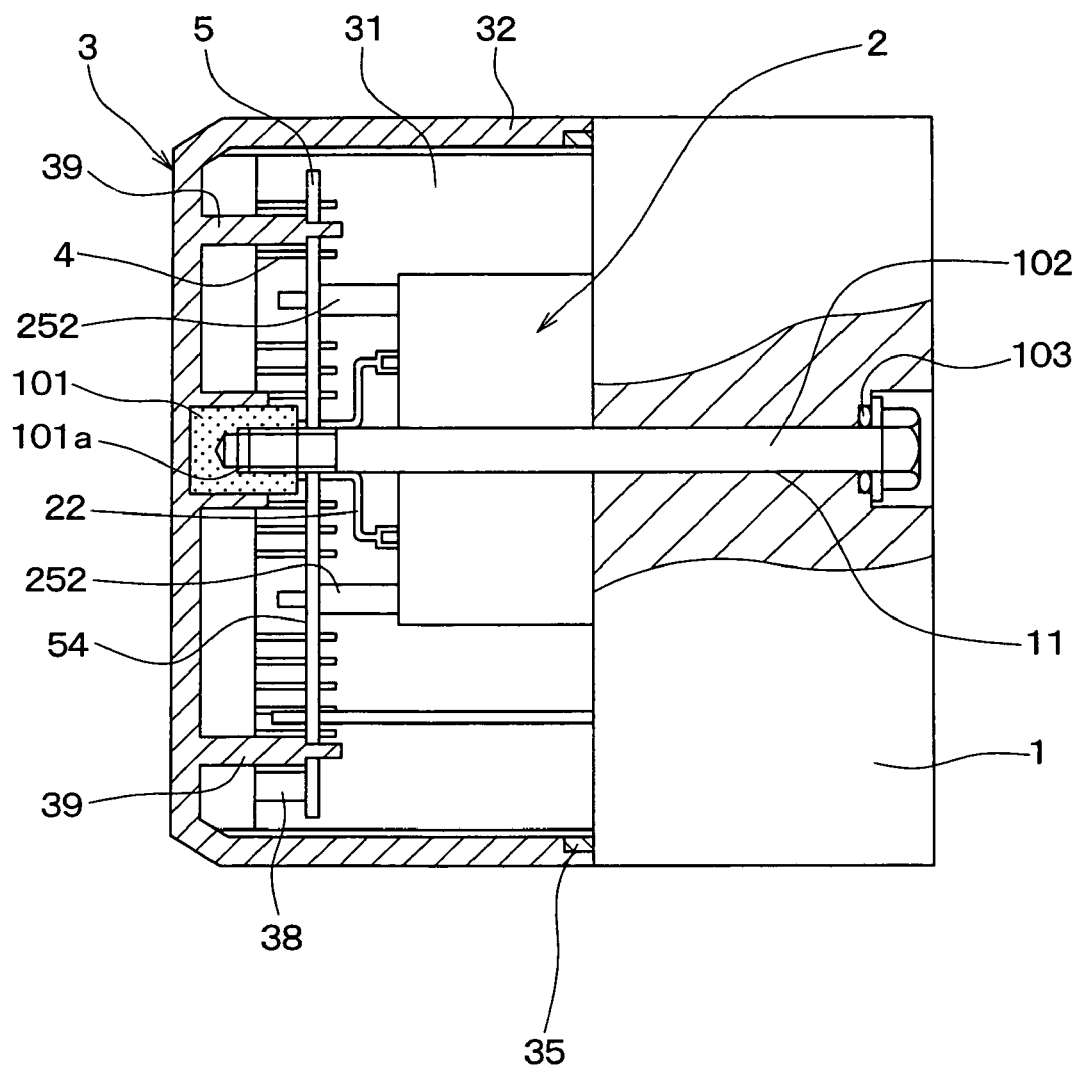
FIG. 10 is a cross-sectional view of a main part of a fluid pressure control device according to a third embodiment of the present invention.

As shown in FIG. 10, a block 101 having an internal thread 101a is formed at the case 3 by insert molding. At the body 1, a through hole 11 is formed to which a bolt 102 is inserted. The case 3 is fixed to the body 1 by inserting the bolt 102 into the body 1 first and then screwing the bolt 102 to the internal thread 101a of the block 101.

A seal ring 103 is located at a head portion of the bolt 102 to prevent water from infiltrating through the through hole 11 into the chamber 31.

In the first and second embodiments, the four screws 6 are used to fix the case 3 to the body 1. In contrast, the screws 6 are disused, and the bolt 102 serves as the only means to fix the case 3 to the body. Therefore, it is possible to reduce the amount of parts for the fluid pressure control device and to reduce the size of the body 1.

Fourth Embodiment

Hereinafter, a fourth embodiment of the present invention is described with reference to FIG. 11. In the present embodiment, the way in which the case 3 is fixed to the body 1 is different from those of the first to third embodiments. A part shown in this embodiment is identical or equivalent to a part in any of the preceding embodiments if the same reference numeral is applied to the two parts. Descriptions for such a part are omitted in this embodiment.

Figure 11:
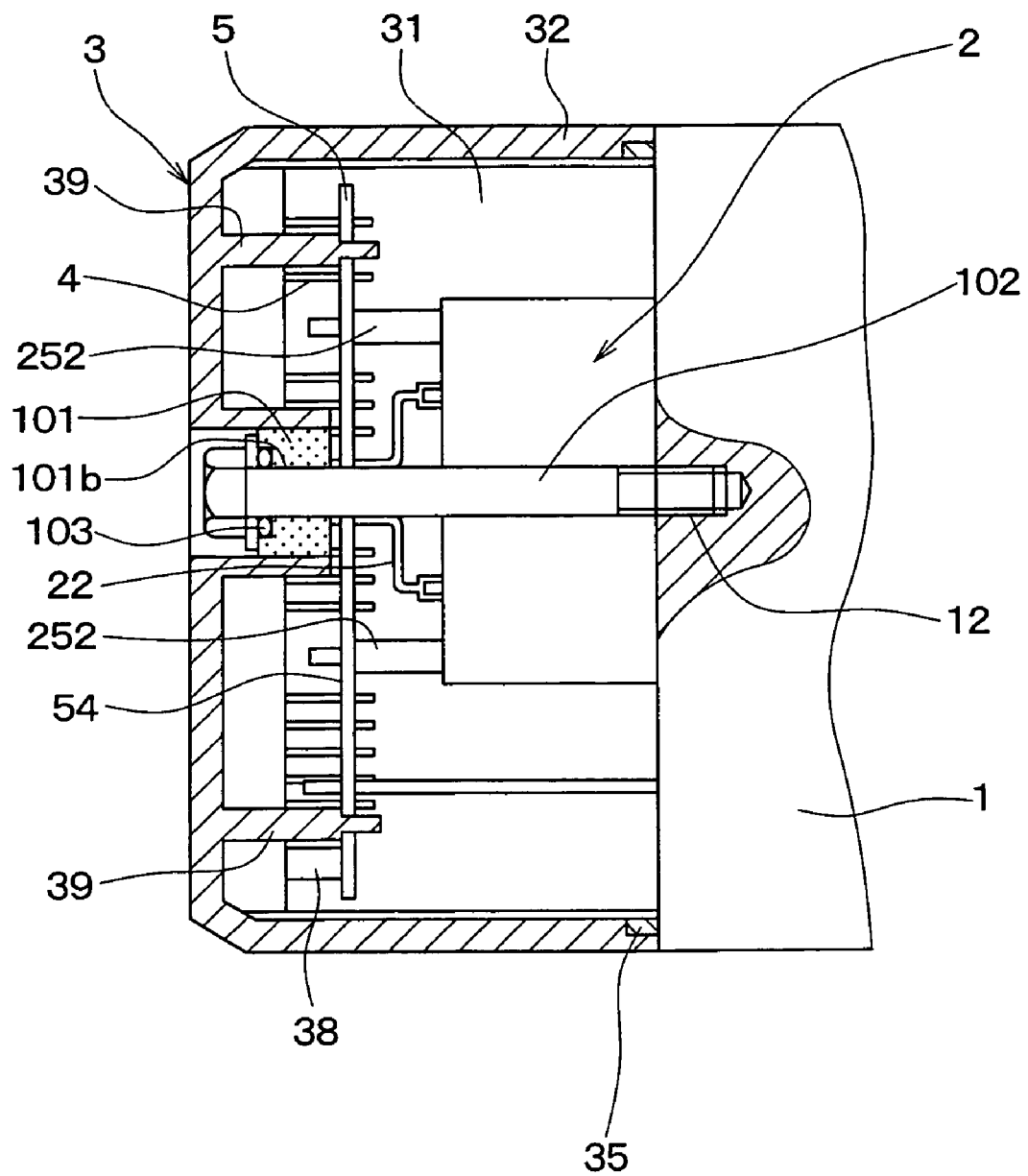
FIG. 11 is a cross-sectional view of a main part of a fluid pressure control device according to a fourth embodiment of the present invention.

As shown in FIG. 11, a block 101 at which a through hole 101b are formed is formed at the case 3 by insert molding. At the body 1, an internal thread 12 is formed to which a bolt 102 is screwed. The case 3 is fixed to the body 1 by inserting the bolt 102 into the through hole 101b of the case 3 first and then screwing the bolt 102 to the internal thread 12 of the body 1.

A seal ring 103 is located at a head portion of the bolt 102 to prevent water from infiltrating through the through hole 11 into the chamber 31.

In the first and second embodiments, the four screws 6 are used to fix the case 3 to the body 1. In contrast, the screws 6 are disused and the bolt 102 is the only means to fix the case 3 to the body. Therefore, it is possible to reduce the amount of parts for the fluid pressure control device and to reduce the size of the body 1.

The body 1 of the present embodiment can be manufactured with a simpler manner compared to the body 1 of the third embodiment. Therefore, it is possible to reduce manufacturing cost of the body 1 and to attain greater flexibility in the layout of the inner structure of the body 1.

Fifth Embodiment

Hereinafter, a fifth embodiment of the present invention is described with reference to FIG. 12. In the present embodiment, relation between the positions of the connector housing 33 of the case 3 and the board 5 is different from those of the first to fourth embodiments. A part shown in this embodiment is identical or equivalent to a part in any of the preceding embodiments if the same reference numeral is applied to the two parts. Descriptions for such a part are omitted in this embodiment.

Figure 12:
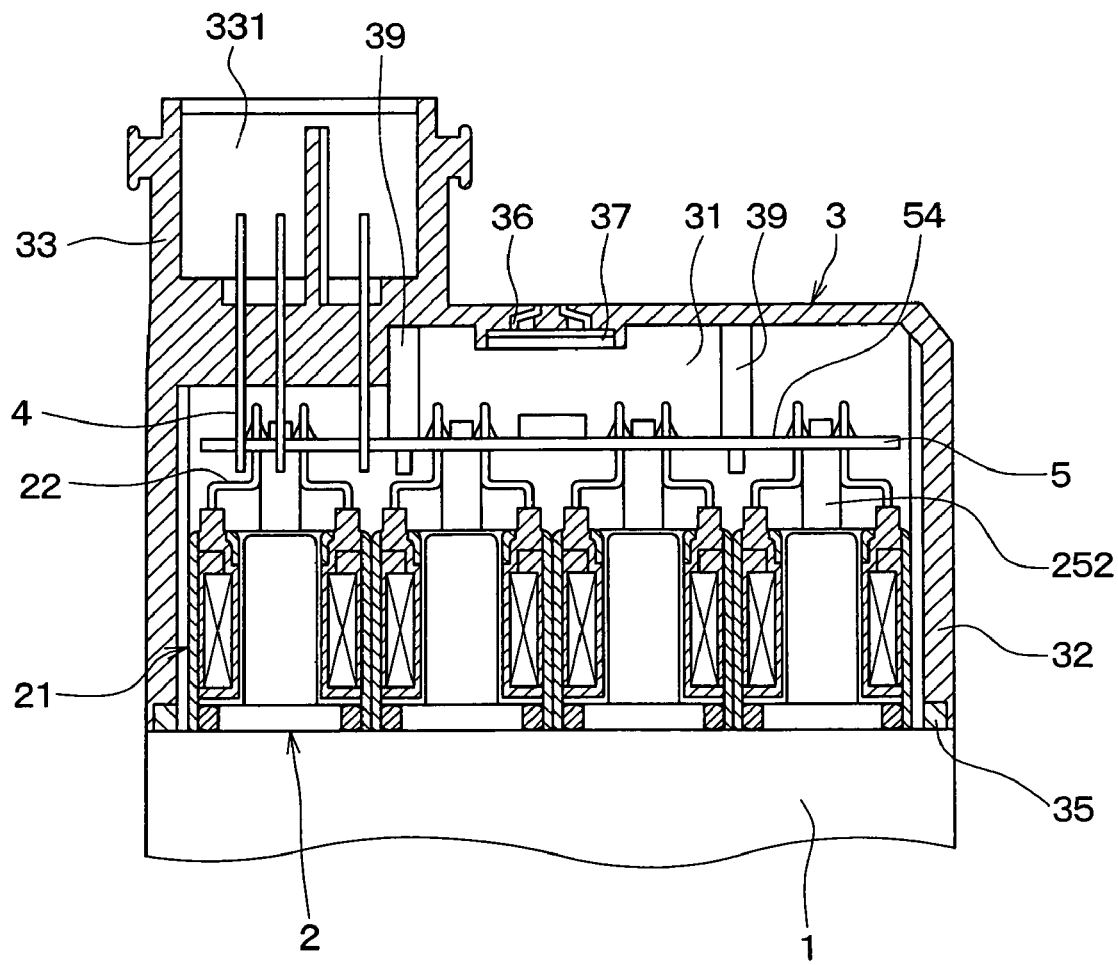
FIG. 12 is a cross-sectional view of a main part of a fluid pressure control device according to a fifth embodiment of the present invention.

As shown in FIG. 12 the connector housing 33 is located at a place facing the board surface 54 of the board 5. The connector housing 33 has an open mouth at the opposite side of the connector housing 33 relative to the board 5.

Therefore, the connector terminals 4 can have a liner shape and can accordingly be arranged easier. As a result, the manufacturing cost of the fluid pressure control device can be decreased.

Sixth Embodiment

Hereinafter, a sixth embodiment of the present invention is described with reference to FIG. 13. In the present embodiment, the way the solenoids 21 and the board 5 are connected with each other is different from those of the first to fifth embodiments. A part shown in this embodiment is identical or equivalent to a part in any of the preceding embodiments if the same reference numeral is applied to the two parts. Descriptions for such a part are omitted in this embodiment.

Figure 13:
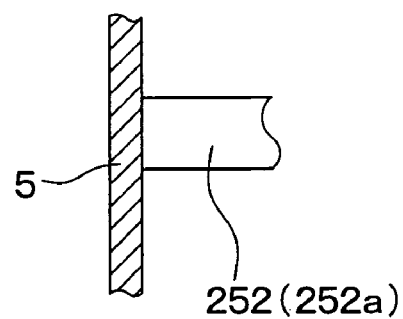
FIG. 13 is a cross-sectional view of a main part of a fluid pressure control device according to a sixth embodiment of the present invention.

As shown in FIG. 13, in the present embodiment, each of first stays 252 of the solenoids 21 only has the large diameter pillar 252a and does not have the small diameter pillar 252b described in the preceding embodiments. The solenoids 21 are connected with the board 5 by bonding tips of the first stays 252 to the board 5.

Seventh Embodiment

Hereinafter, a seventh embodiment of the present invention is described with reference to FIG. 14. In the present embodiment, the way the solenoids 21 and the board 5 are connected with each other is different from those of the first to sixth embodiments. A part shown in this embodiment is identical or equivalent to a part in any of the preceding embodiments if the same reference numeral is applied to the two parts. Descriptions for such a part are omitted in this embodiment.

Figure 14:
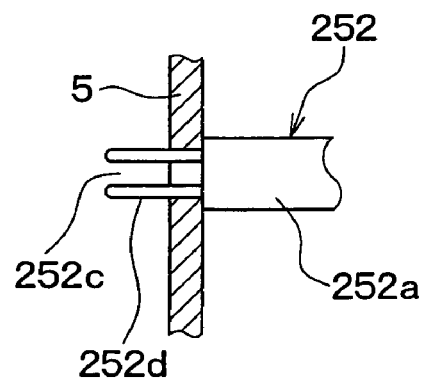
FIG. 14 is a cross-sectional view of a main part of a fluid pressure control device according to a seventh embodiment of the present invention.
Figure 15:
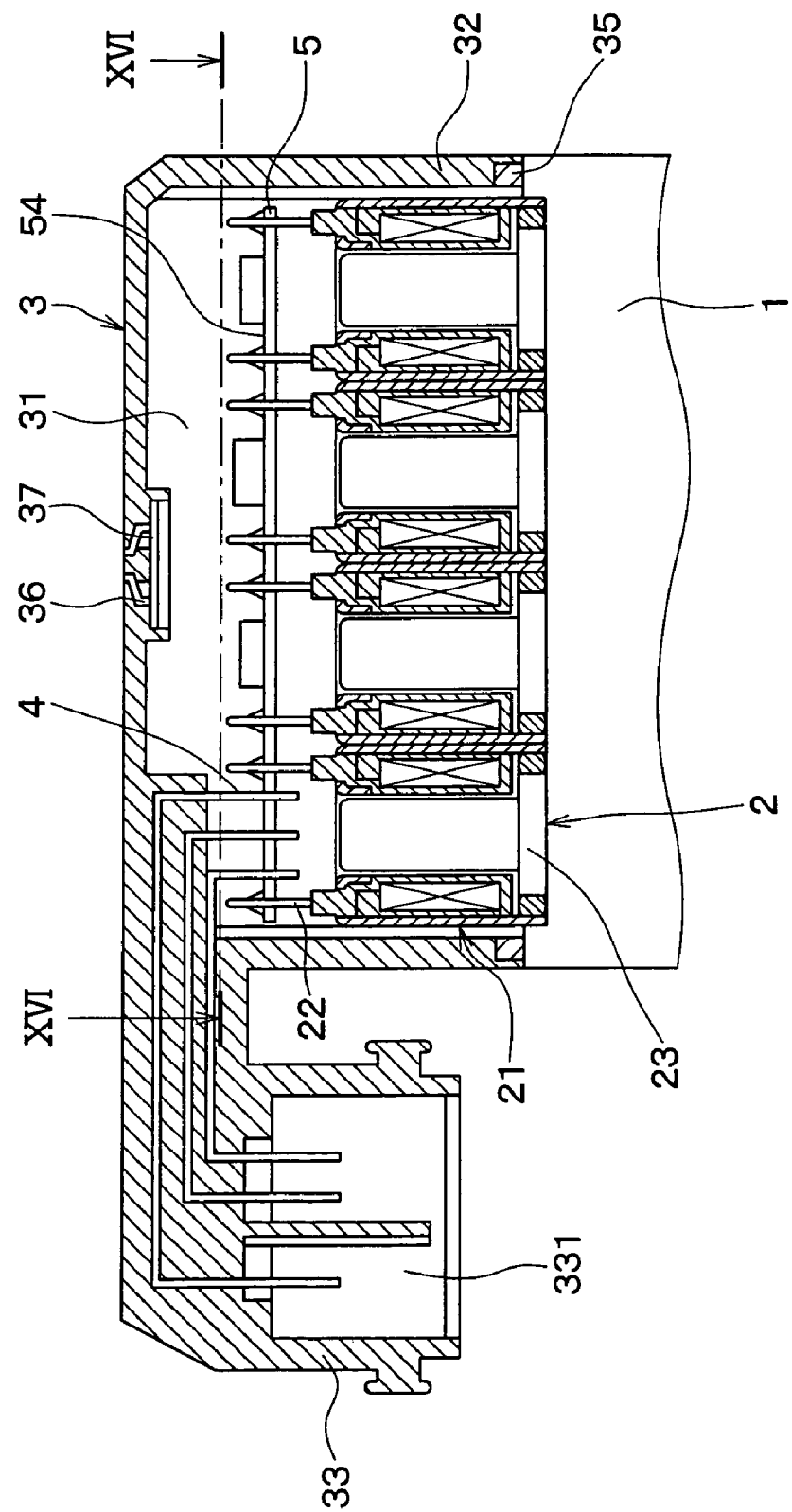
FIG. 15 is a cross-sectional view of a main part of a fluid pressure control device according to an eighth embodiment of the present invention.
Figure 16:
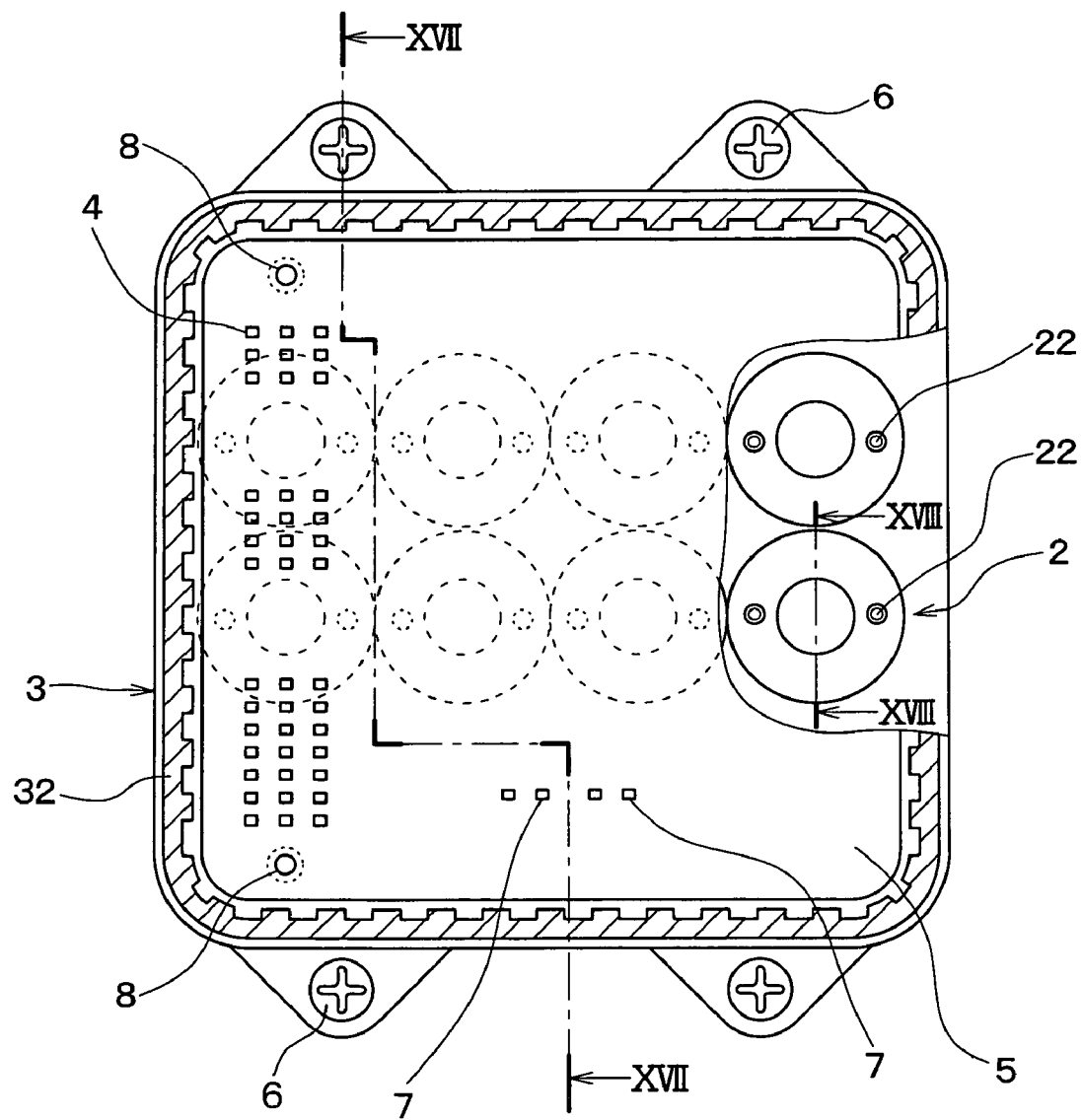
FIG. 16 is a cross-sectional view taken along the XVI-XVI line in FIG. 15.
Figure 17:
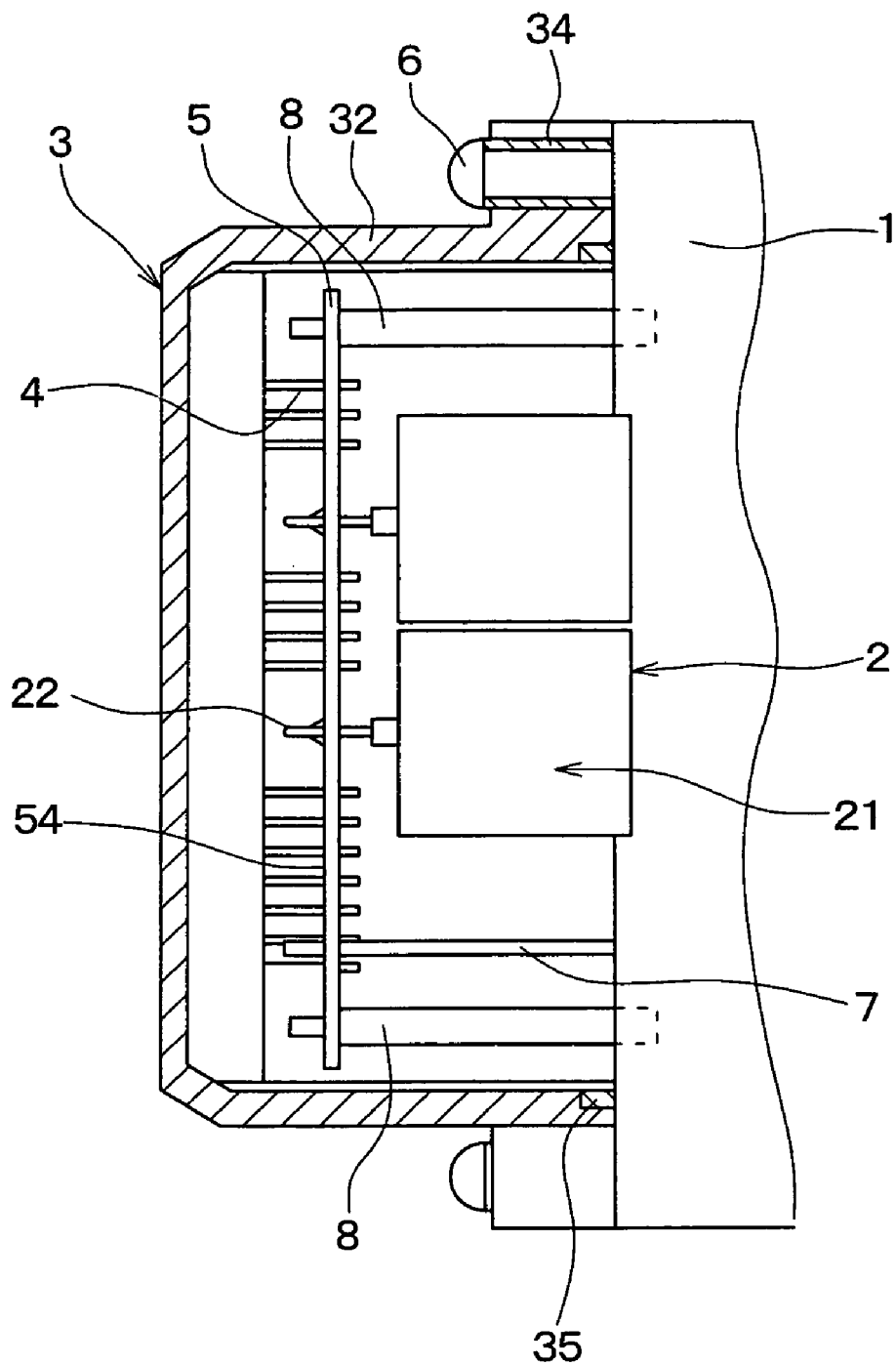
FIG. 17 is a cross-sectional view taken along the XVII-XVII line in FIG. 16.
Figure 18:
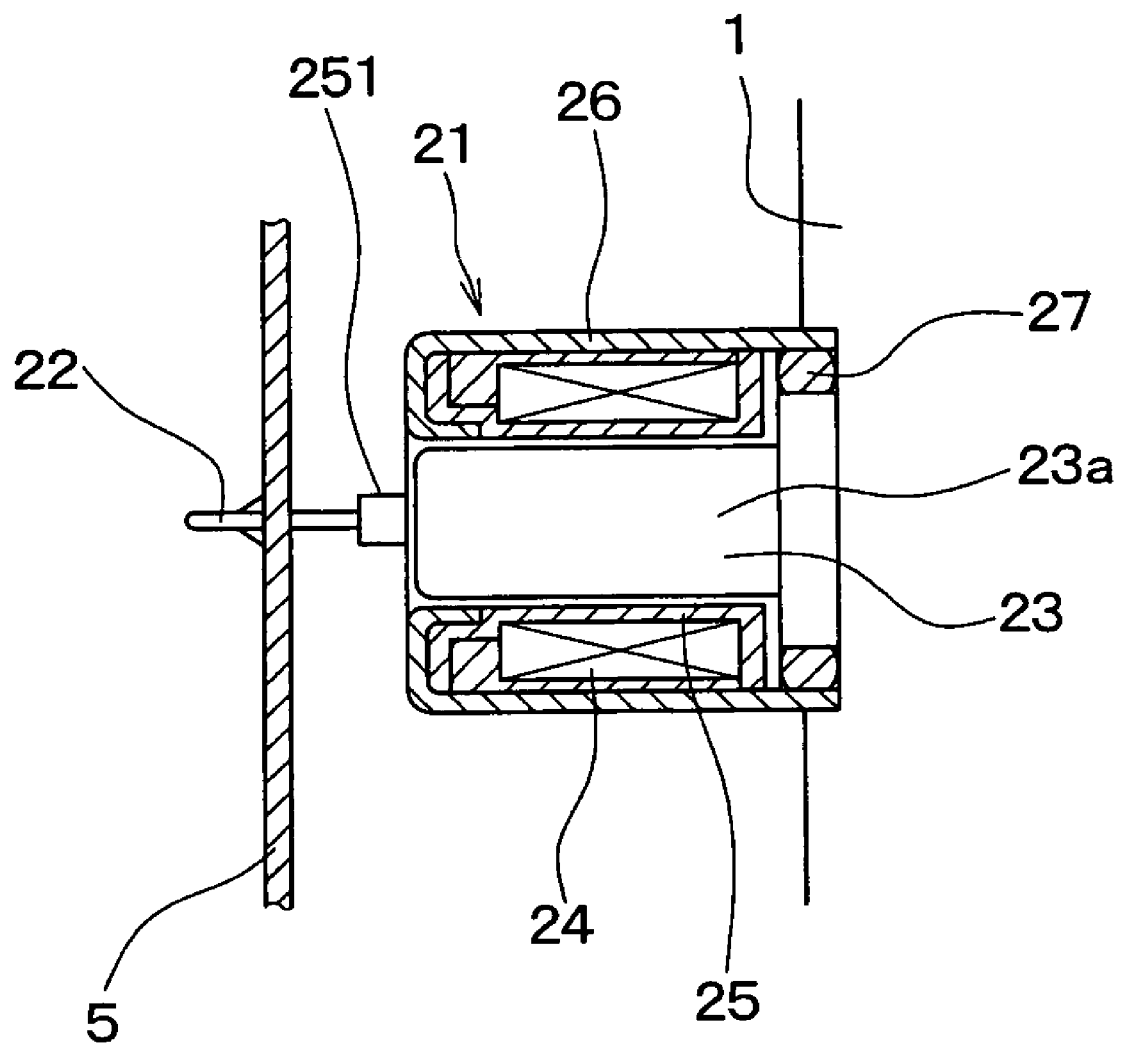
FIG. 18 is a cross-sectional view taken along the XVIII-XVIII line in FIG. 16.

As shown in FIG. 14, in the present embodiment, each of the first stays 252 of the solenoids 21 includes the large diameter pillar 252a and two locking parts 252d. The locking parts 252d protrude from an end of the large diameter pillar 252a, extend toward the board 5, and are divided from each other by a slit 252c. The solenoids 21 are connected with the board 5 when the locking parts 252d are inserted to the corresponding stay insertion holes 52, respectively. More specifically, a force for connecting the board 5 and the first stays 252 are generated when the locking parts 252d are fitted in the stay insertion holes 52 and are pressed by inner surfaces of the board 5 surrounding the stay insertion holes 52.

Eighth Embodiment

Hereinafter, an eighth embodiment of the present invention is described with reference to FIGS. 15 to 18.

In the present embodiment, the way the solenoids 21 and the board 5 are connected with each other is different from that of the first embodiment. A part shown in this embodiment is identical or equivalent to a part in the first embodiment if the same reference numeral is applied to the two parts. Descriptions for such a part are omitted in this embodiment.

As shown in FIGS. 15 to 18, in the present embodiment, the first stays 252 are disused although they are used in the fluid pressure control device according to the first embodiment. Instead of the first stays 252, the solenoid terminals 22 are used so that the board 5 is fixed to and supported by the solenoids 21 in a co-moving manner as a single body. By discussing the first stays 252, the board 5 can be fixed to the solenoid 21 while allowing the fluid pressure control device to have a simpler structure.

In the first embodiment, each of the solenoid terminals 22 has a clinching portion to facilitate elastic deformation of the solenoid terminal. In contrast, the solenoid terminals 22 of the present embodiment discuses the clinching portions. In other words, each of the solenoid terminals 22 in the present embodiment has a linear shape. The solenoid terminals 22 are thicker than the coil wires 24 and are therefore stiffer than the than the coil wires 24.

More specifically, the pillars 8 in the present embodiment is made of material (for example, brass) which makes the pillars 8 expand and contract to an degree equivalent to expansion and contraction of the solenoids 21 and the solenoid terminals 22 when the pillars 8 receives heat. Thus, the relative movement between the solenoid terminals 22 and the board 5 under heat load is suppressed to make the clinching portions unnecessary.

By discussing the clinching portion, the distance between the solenoid valves 2 and the board 5 can be reduced. Therefore, the reduction of the distance contributes, in combination with the disuse of the conventional partitioning wall and the conventional cover for covering the partitioning wall, reduction of the size of the fluid pressure control device.

In addition, the pillars 8 are loosely fitted to the corresponding holes (not shown) of the board 5. In the case that the amount of expansion of the solenoid terminals 22 under the heat load becomes larger than that of the pillars 8, the pillars 8 and board 5 can move relative to each other since they are loosely connected. Therefore, it is possible to suppress generation of stresses at contact portions where the solenoid terminals 22 come in contact with the board 5.

In the present embodiment, stresses are generated at the contact portions under vibration. However, the stresses caused by the vibration are less continuous and smaller than the stresses at the contact portions caused by the difference of the thermal expansion coefficient.

Ninth Embodiment

Hereinafter, a ninth embodiment of the present invention is described with reference to FIGS. 19 to 21.

In the present embodiment, the way the solenoids 21 and the board 5 are connected with each other is different from that of the second embodiment. A part shown in this embodiment is identical or equivalent to a part in the second embodiment if the same reference numeral is applied to the two parts. Descriptions for such a part are omitted in this embodiment.

Figure 19:
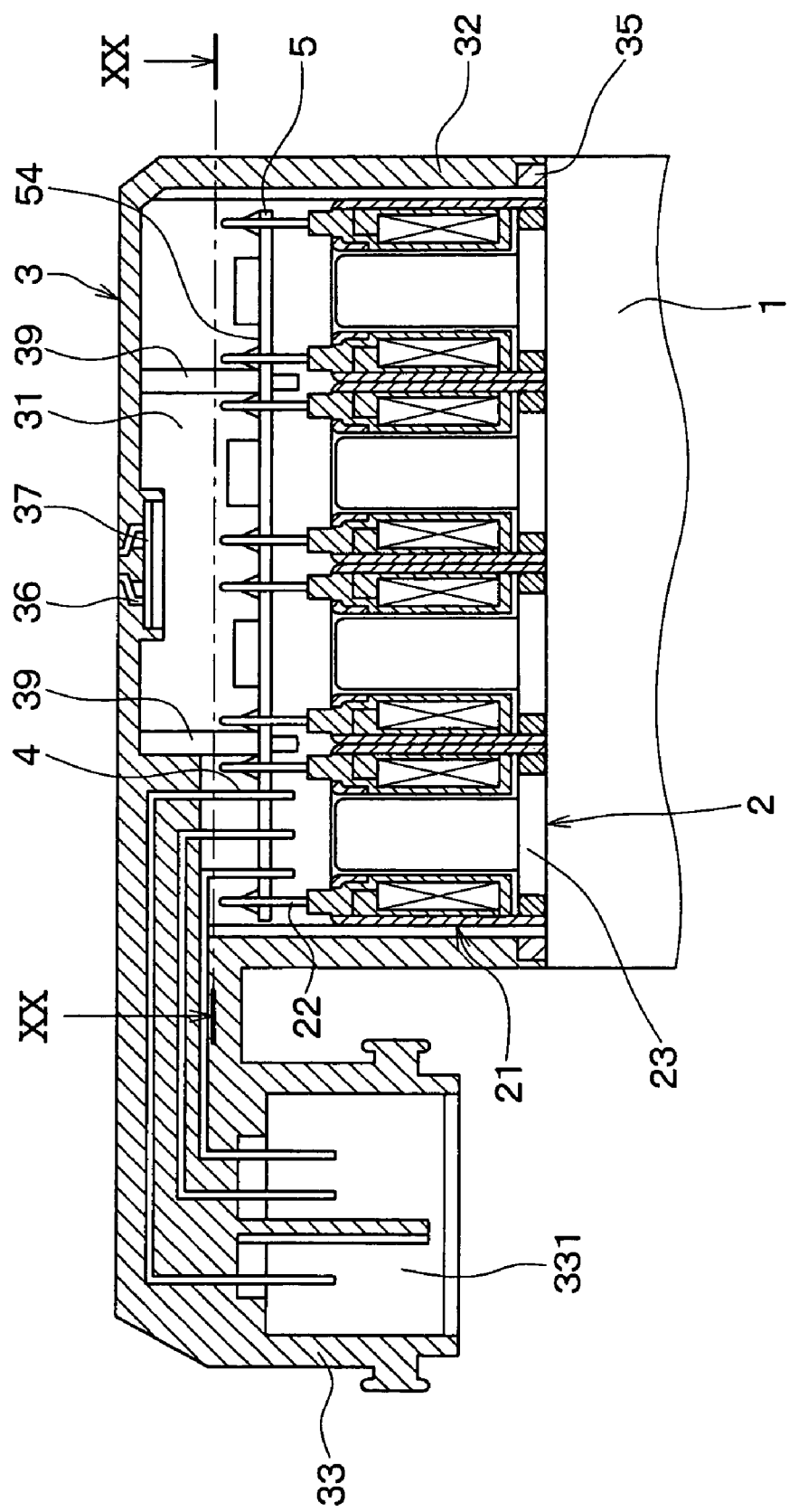
FIG. 19 is a cross-sectional view of a main part of a fluid pressure control device according to a ninth embodiment of the present invention.
Figure 20:
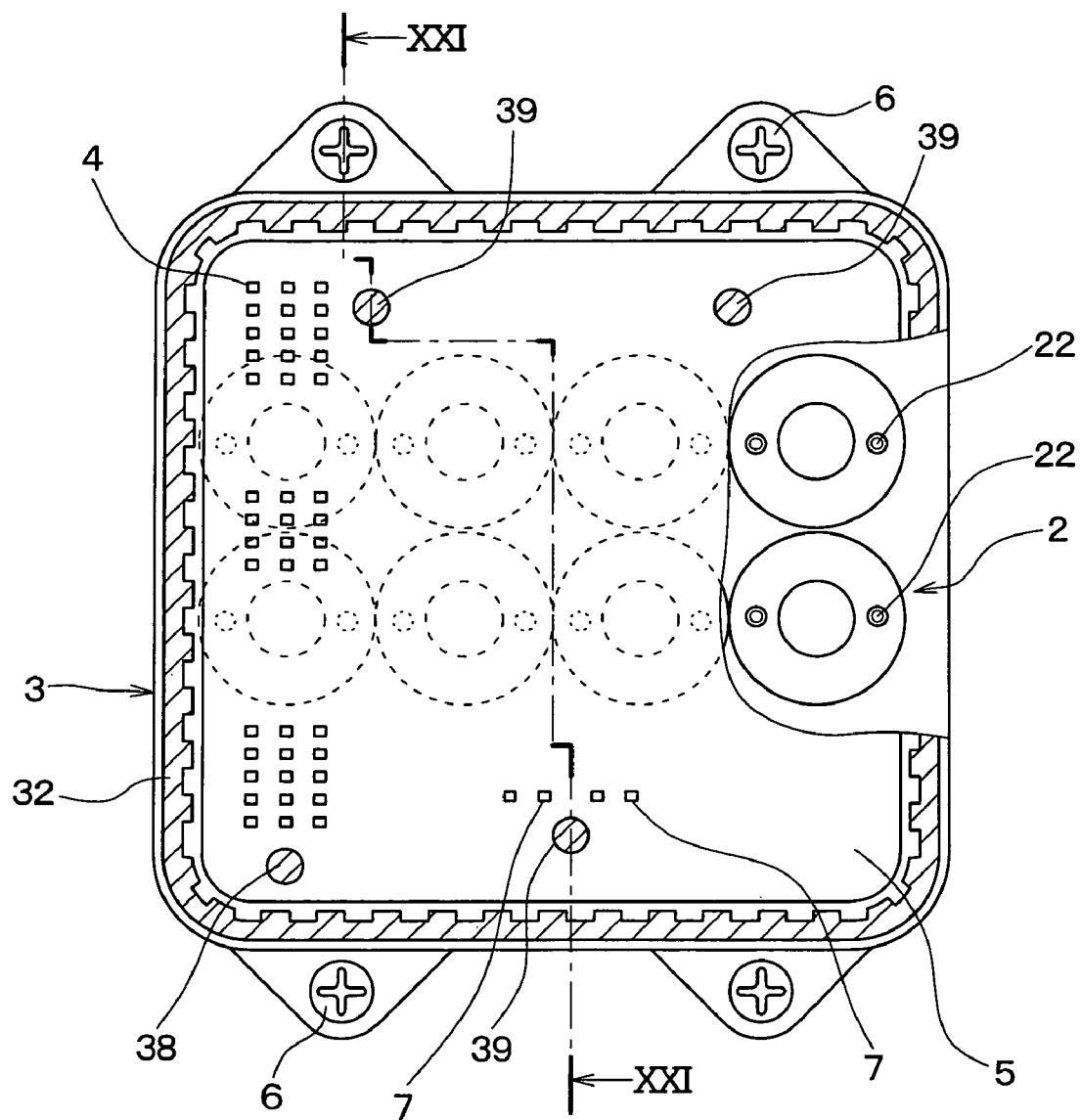
FIG. 20 is a cross-sectional view taken along the XX-XX line in FIG. 19.
Figure 21:
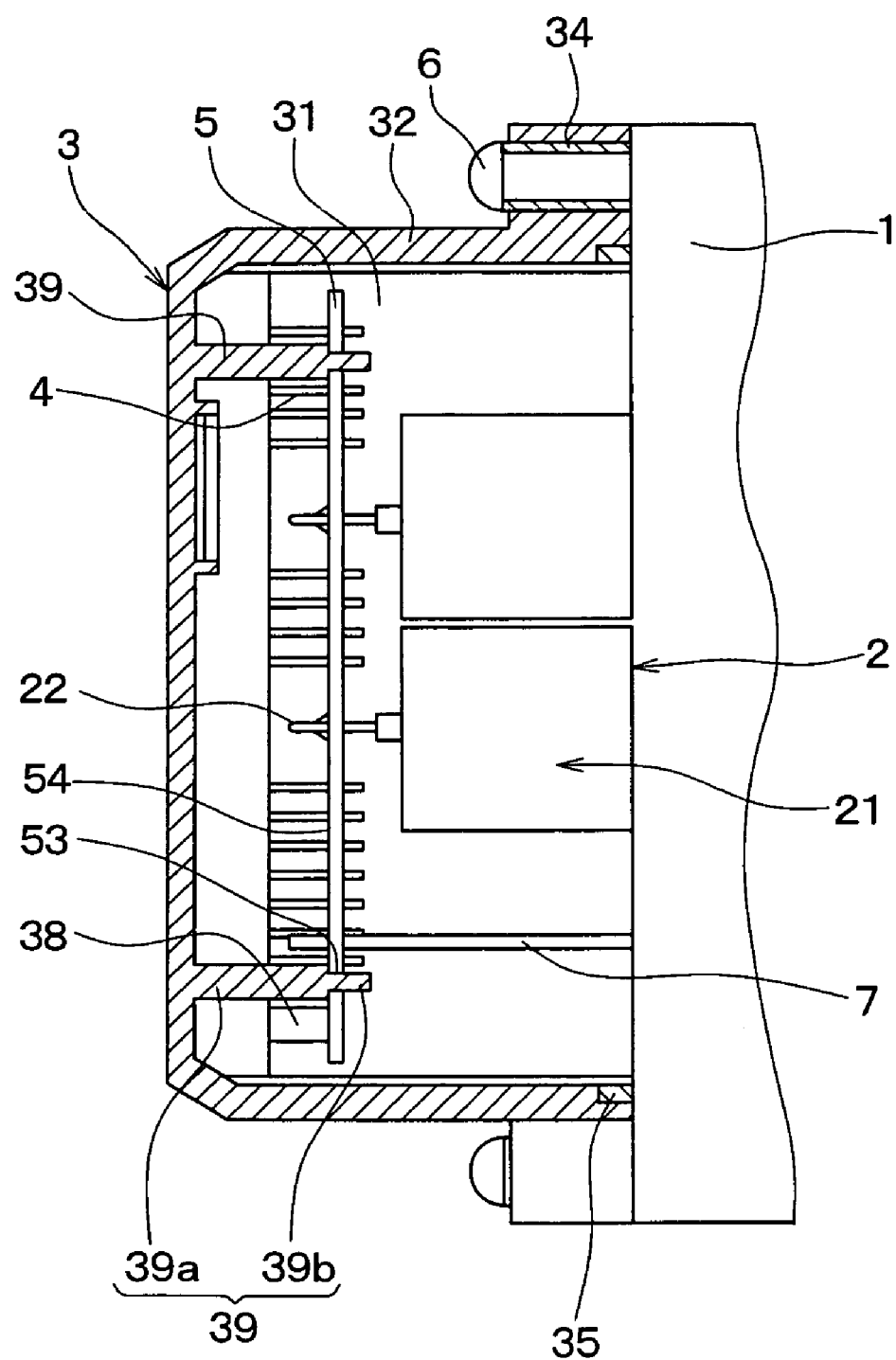
FIG. 21 is a cross-sectional view taken along the XXI-XXI line in FIG. 20.
Figure 22:
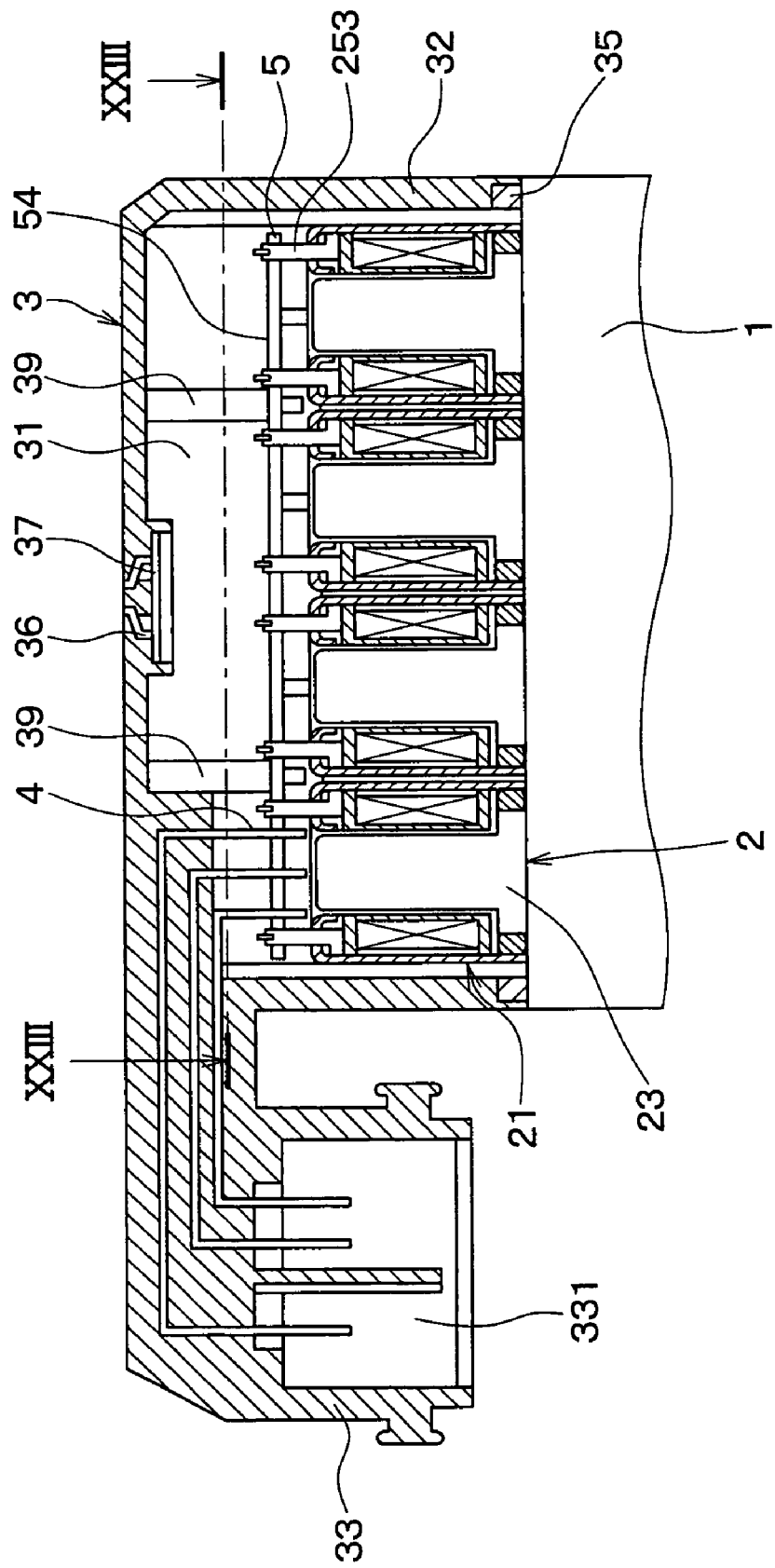
FIG. 22 is a cross-sectional view of a main part of a fluid pressure control device according to a tenth embodiment of the present invention.
Figure 23:
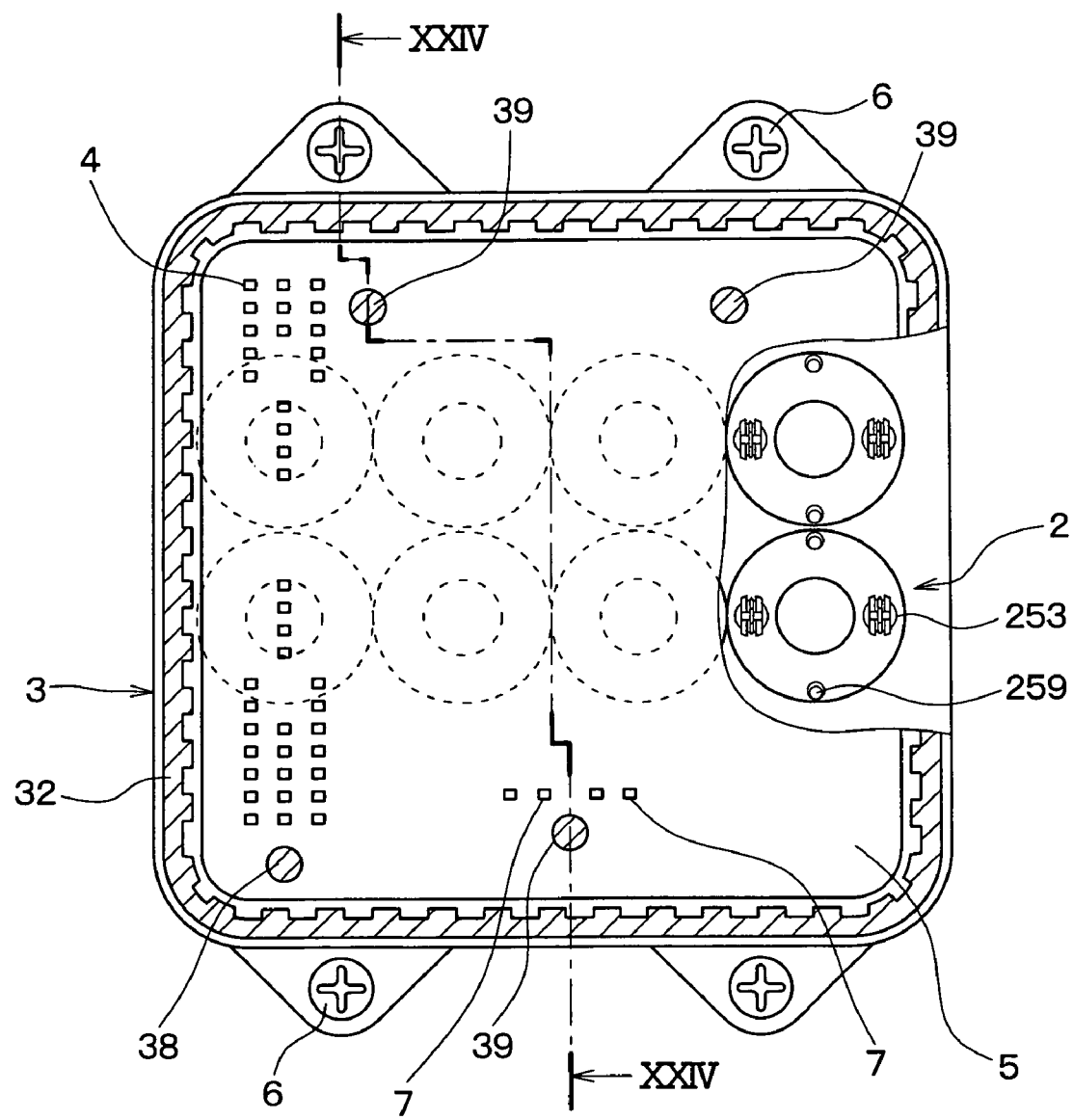
FIG. 23 is a cross-sectional view taken along the XXIII-XXIII line in FIG. 22.
Figure 24:
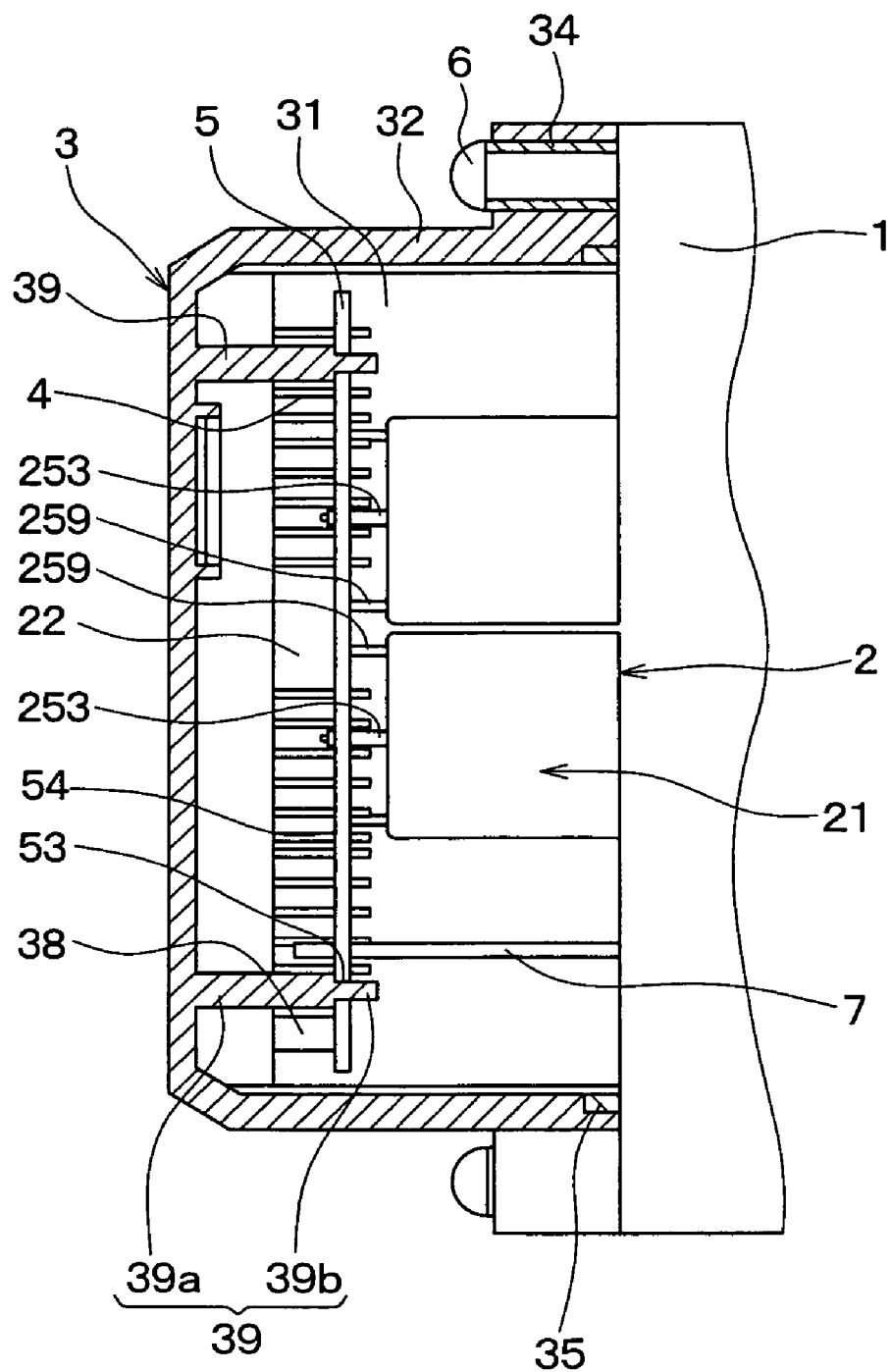
FIG. 24 is a cross-sectional view taken along the XXIV-XXIV line in FIG. 23.

As shown in FIGS. 19 to 21, in the present embodiment, the first stays 252 are disused although they are used in the fluid pressure control device according to the second embodiment. Instead of the first stays 252, the solenoid terminals 22 are used so that the board 5 is fixed to and supported by the solenoids 21 in a co-moving manner as a single body. By discussing the first stays 252, the board 5 can be fixed to the solenoid 21 while allowing the fluid pressure control device to have a simpler structure. The solenoid terminals 22 are thicker than the coil wires 24 and are therefore stiffer than the than the coil wires 24.

The solenoids 21 are not fixed to the body 1 and are suspended from the board 5 only by using the solenoid terminals 22. Therefore, the solenoid terminals 22 and the board 5 do not move relative to each other under the heat load. Accordingly, the clinching portions of the solenoid terminals 22 in the second embodiment are not necessary in the present embodiment. Therefore, the distance between the solenoid valves 2 and the board 5 can be reduced. The reduction of the distance contributes, in combination with the disuse of the conventional partitioning wall and the conventional cover for covering the partitioning wall, reduction of the size of the fluid pressure control device.

In the present embodiment, stresses are generated at the contact portions under vibration. However, the stresses caused by the vibration are less continuous and smaller than the stresses at the contact portions caused by the difference of the thermal expansion coefficient.

Tenth Embodiment

Hereinafter, a tenth embodiment of the present invention is described with reference to FIGS. 22 to 28.

In the present embodiment, the way the solenoids 21 and the board 5 are connected with each other is different from that of the second embodiment. In addition, the solenoid terminals 22 in the second embodiment are disused. A part shown in this embodiment is identical or equivalent to a part in the second embodiment if the same reference numeral is applied to the two parts. Descriptions for such a part are omitted in this embodiment.

As shown in FIGS. 22 to 28, a pair of first stays 253 is formed on each of all bobbins 25 of all the solenoid valves 2. The first stays 253 belonging to the same pair are located at the opposite positions with respect to the axis of the corresponding solenoid valve 2. Each of the first stays 253 protrudes toward the board 5 and is divided into a first pillar 254 and a second pillar 255 by a slit 253a. Each of the first and second pillars 254, 255 has a semicircular cross section. A pair of engagement portions 254a is formed at the top (an end closer to the board 5) of the first pillar 254, and a pair of engagement portions 255a is formed at the top of the second pillar 255. The engagement portions 254a and 255a can be engaged with the corresponding stay insertion holes 52.

A first guide portion 256 and a second guide portion 257 are formed for to each of the first stays 253 at the corresponding bobbins 25. The first guide portion 256 forms a slit communicating with an end of the first pillar 254 opposite to the top of the first pillar 254. The second guide portion 257 forms a slit communicating with an end of the first pillar 255 opposite to the top of the first pillar 255.

A corresponding one of the coil wires 24 goes through the inside of the first guide portion 256 and is guided along an outer peripheral surface of the first pillar 254 to the top of the first pillar 254. The coil wire 24 is bent at each of the tops of the first pillar 254 and the second pillar 255 to form a clinching portion 241. The coil wire 24 is further guided from the clinching portion 241 along an outer peripheral surface of the second pillar 255 to an end of the second pillar 255 opposite to the top of the second pillar 255. Furthermore, an end 242 of the coil wire 24 is inserted into the second guide portion 257. A portion of the coil wire 24 going along the first pillar 254 and the second pillar 255 is plated in order to increase strength of the portion and to improve electrical conduction of the portion.

After arranging the coil wire 24 in the above manner, heated liquid like plastic is poured into a portion between the pair of the engagement portions 254a of the first pillar 254 and into a portion between the pair of the engagement portions 255a of the second pillar 255, so that the coil wire 24 is fixed to the corresponding first stay 253 when the liquid like plastic is cooled down and solidified. In addition, heated liquid like plastic is also poured into the first guide portion 256, the second guide portion 257, and an outer periphery 258 of the bobbin 25.

Figure 25:
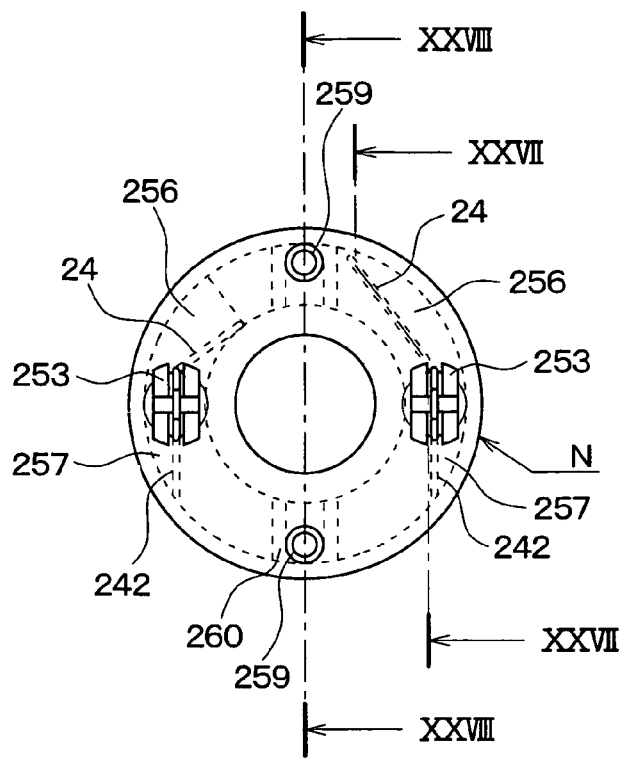
FIG. 25 is a plan view of a solenoid shown in FIG. 22.
Figure 26:
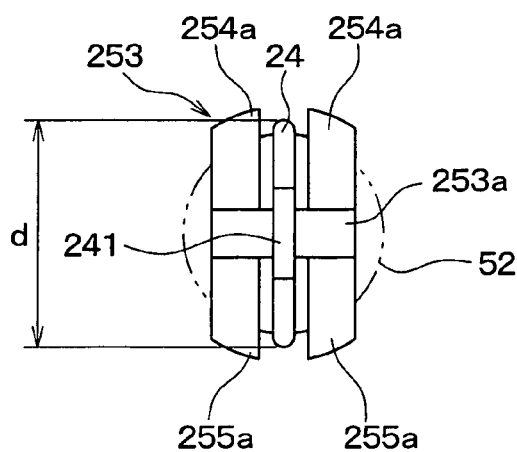
FIG. 26 is a magnified view of an N portion shown in FIG. 25.
Figure 27:
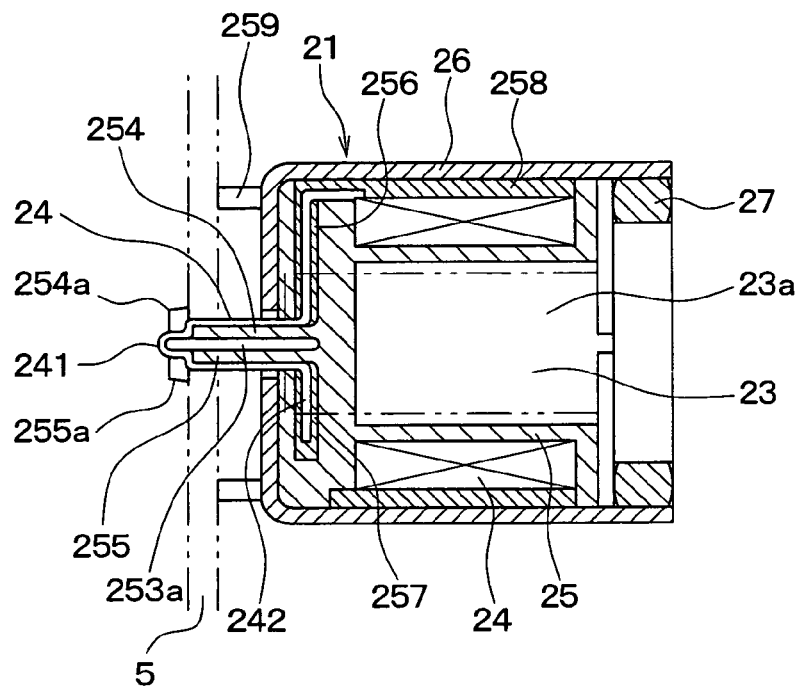
FIG. 27 is a cross-sectional view taken along the XXVII-XXVII line in FIG. 25.
Figure 28:
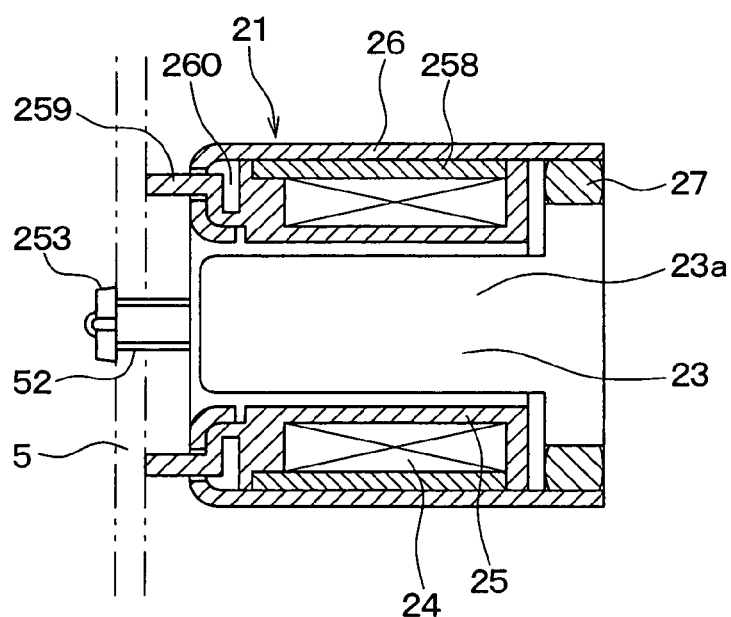
FIG. 28 is a cross-sectional view taken along the XXVIII-XXVIII line in FIG. 25.

As shown in FIGS. 25 and 28, at each the bobbins 25 of all the solenoid valves 2, a pair of poles 259 is integrally formed with the bobbin 25. The poles 259 belonging to the same pair are located at the opposite positions with respect to the axis of the corresponding solenoid valve 2 and are located at positions rotated by 90 degrees around the axis relative to the corresponding first stays 253. Each of the poles 259 protrudes toward the board 5, and the tip of the pole 259 can get in contact with the board 5. A diversion space 260 is formed at a base side of the each of the poles 259 facing the corresponding bobbin 25. The poles 259 can be bent with the base side serving as a supporting point.

In the present embodiment, when one of the first stays 253 is inserted to the corresponding stay insertion hole 52 to a degree that the engagement portions 254a and 255a passes through the stay insertion hole 52, the corresponding poles 259 comes in contact with the board 5 and are bent. Therefore, the board 5 is supported by the engagement portions 254a, 255a and the poles 259 between the engagement portions 254a, 255a and the poles 259. Thus, the board 5 and solenoid valves 2 are fixed together in a co-moving manner as a single body.

The width of each of the slit 253a is larger than a sum of a first run-off length and a second run-off length. The first run-off length is a length of a run-off portion of the corresponding engagement portion 254a of the first pillar 254, wherein the run-off portion is a portion which is to be located outside of the corresponding stay insertion hole 52. The second run-off length is a length of a run-off portion of the corresponding engagement portion 255a of the second pillar 255, wherein the run-off portion is a portion which is to be located outside of the corresponding stay insertion hole 52. Therefore, the first pillar 254 and the second pillar 255 can deform to narrow the slit 253a and thereby pass through the stay insertion hole 52 when the corresponding first stay 253 is inserted to the stay insertion hole 52.

In a situation where the board 5 and the solenoids 21 are not fixed to each other in a co-moving manner as a single body, an external dimension d of the portion of the coil wire 24 going along the first pillar 254 and second pillar 255 is slightly larger than the diameter of the stay insertion hole 52. Therefore, in a situation where the board 5 and the solenoid 21 are fixed to each other as a single body, the portion of the coil wire 24 is in tight contact with the board 5. Therefore, conduction between the coil wire 24 and the board 5 is ensured. With the coil wire 24 directly connected to the board 5, the solenoid terminals 22 can be disused and the manufacturing cost of the fluid pressure control device can be reduced.

In the present embodiment, the solenoids 21 are not fixed to the body 1. However, the method for connecting the solenoids 21 with the board 5 in the present embodiment can be applied to an embodiment in which the solenoids 21 are fixed to the body 1 by caulking as described in the first embodiment.

Eleventh Embodiment

Hereinafter, an eleventh embodiment of the present invention is described with reference to FIGS. 29 and 30.

In the present embodiment, the way each of the coil wires 24 is fixed to the corresponding first stays 253 is different from that of the tenth embodiment. A part shown in this embodiment is identical or equivalent to a part in the tenth embodiment if the same reference numeral is applied to the two parts. Descriptions for such a part are omitted in this embodiment.

Figure 29:
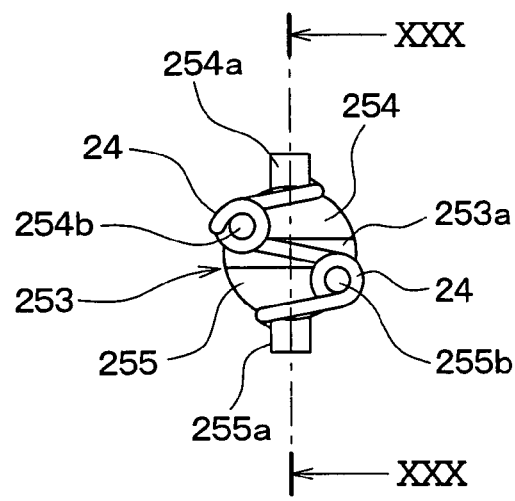
FIG. 29 is a plan view of a main part of a solenoid valve used for a fluid pressure control device according to an eleventh embodiment of the present invention.
Figure 30:
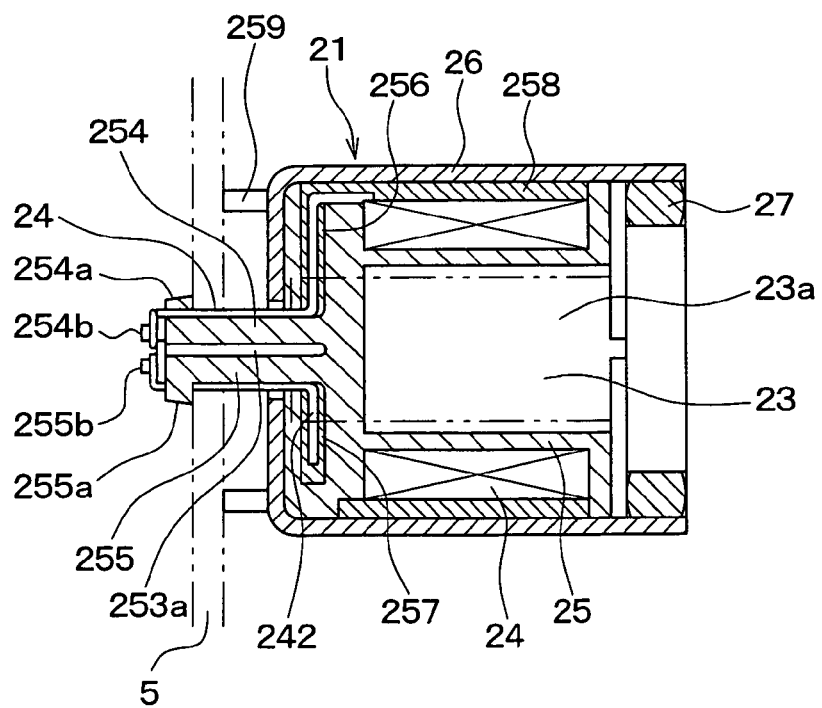
FIG. 30 is a cross-sectional view taken along the XXX-XXX line in FIG. 29.

As shown in FIGS. 29 and 30, an engagement portion 254a and an engagement portion 255a are formed respectively at the first pillar 254 and the second pillar 255 of each of the first stays 253. A protrusion 254b is formed at the top (an end closer to the board 5) of the first pillar 254, and a protrusion 255b is formed at the top of the second pillar 255. The protrusion 254b and the protrusion 255b are located at the opposite sides of the corresponding slit 253a. In addition, the protrusion 254b and the protrusion 255b are aligned in a diagonal line, that is, they are located at the opposite direction from the center of the slit 253a. The coil wire 24 is twisted around the protrusions 254b, 255b at the tops of the pillar 254, 255 so that the coil wire 24 is fixed to the first stay 253.

Twelfth Embodiment

Figure 31:
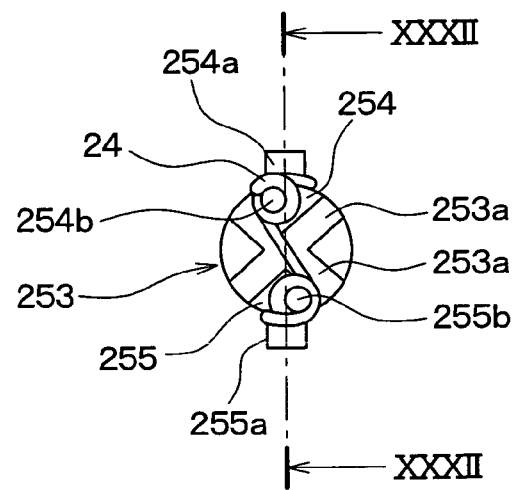
FIG. 31 is a plan view of a main part of a solenoid valve used for a fluid pressure control device according to a twelfth embodiment of the present invention.
Figure 32:
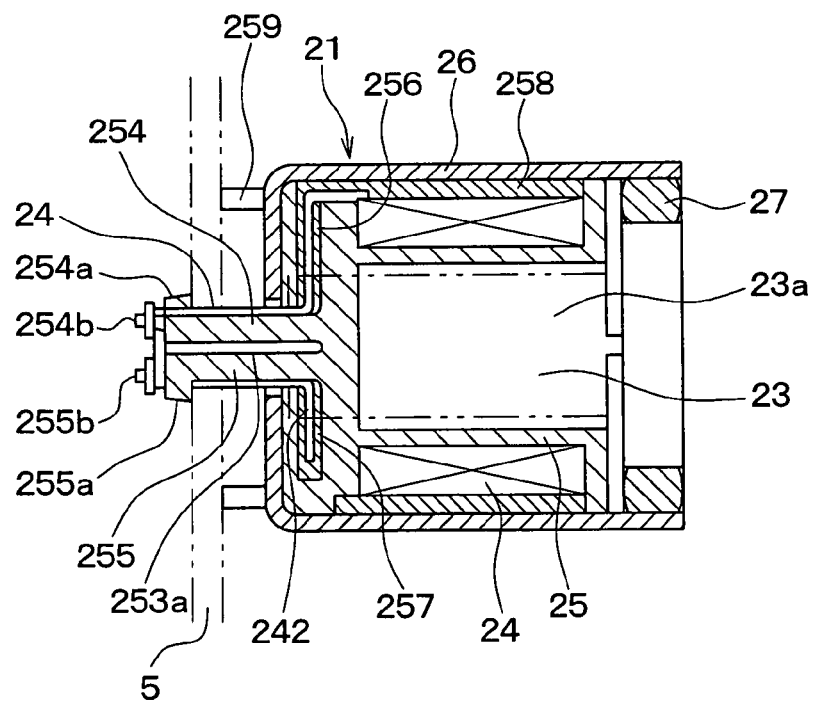
FIG. 32 is a cross-sectional view taken along the XXXII-XXXII line in FIG. 31.

Hereinafter, a twelfth embodiment of the present invention is described with reference to FIGS. 31 and 32. A part shown in this embodiment is identical or equivalent to a part in the eleventh embodiment if the same reference numeral is applied to the two parts. Descriptions for such a part are omitted in this embodiment.

In the present embodiment, the structure of each of the first stays 253 is different from that of the eleventh embodiment. More specifically, as shown in FIGS. 31 and 32, each of the first stays 253 is divided into four pillars by two slits 253 intersecting with each other, so that the first stays 253 are easily bent.

Thirteenth Embodiment

Hereinafter, a thirteenth embodiment of the present invention is described with reference to FIGS. 33 and 34.

In the present embodiment, the way each of the coil wires 24 is electrically connected with the board 5 is different from that of the tenth embodiment. A part shown in this embodiment is identical or equivalent to a part in the tenth embodiment if the same reference numeral is applied to the two parts. Descriptions for such a part are omitted in this embodiment.

Figure 33:
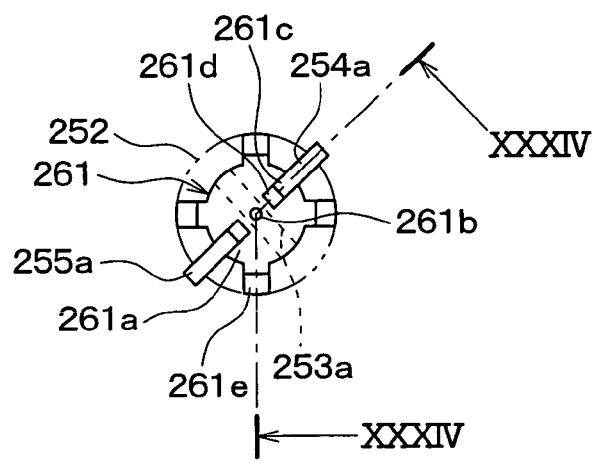
FIG. 33 is a plan view of a main part of a solenoid valve used for a fluid pressure control device according to a thirteenth embodiment of the present invention.
Figure 34:
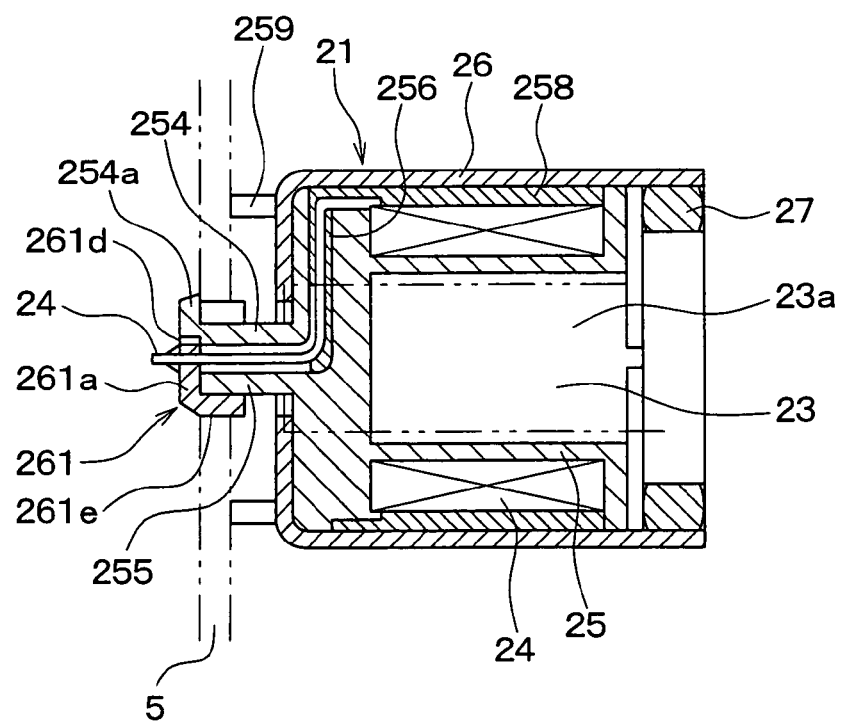
FIG. 34 is a cross-sectional view taken along the XXXIV-XXXIV line in FIG. 33.

As shown in FIGS. 33 and 34, each of the first stays 253 is divided into a first pillar 254 and a second pillar 255 by a slit 253a. An engagement portion 254a is formed at the first pillar 254 and an engagement portion 255a is formed at the second pillar 255. A first guide portion 256 forms a slit communicating with the slit 253a. The coil wire 24 goes through the interior of the first guide portion 256 and the slit 253a and is guided to the top of the first stay 253.

The coil wire 24 is electrically connected with the board 5 through a cap 261 made of conducting metal which is fitted to the top side of the first stays 253. The cap 261 includes a circular disc portion 261a. The coil wire 24 is inserted into a through hole 261b formed at the center of the disc portion 261a and is soldered at the through hole 26.

Two notches 261c are formed at the disc portion 261a. The engagement portions 254a and 255a are inserted respectively to the notches 261c, which prevents the cap 261 from rotating. A buffering space 261d is formed between the engagement portions 254a and the corresponding notch 261c, so that the engagement portion 254a is not interfered by the notch 261c when the engagement portion 254a moves while getting through the corresponding stay insertion hole 52 of the board 5. In a similar manner, another buffering space 261d is formed between the engagement portions 255a and the corresponding notch 261c, so that the engagement portion 255a is not interfered by the notch 261c when the engagement portion 255a moves while getting through the corresponding stay insertion hole 52 of the board 5.

A plurality (in this instance, four in number) of arm portions 261e is formed at the periphery of the disc portion 261a. The arm portions 261e extend in parallel with the corresponding first stays 253. In a situation where the board 5 and the solenoids 21 are not fixed as a single body, the diameter of a circle circumscribed around the four arm portions 261e is slightly larger than the diameter of the corresponding stay insertion hole 52, and the diameter of a circle inscribed inside the four arm portions 261e is slightly larger than the diameter of the corresponding first stay 253.

In the present embodiment, the cap 261 is connected with the solenoid 21 and then the cap 261 is press fitted into the corresponding stay insertion hole 52. Accordingly, the arm portions 261e clamp the first stay 253, and the cap 261 is firmly fixed to the first stay 253. Then the first stay 253 is inserted to the stay insertion hole 52 to a degree that the engagement portions 254a and 255a passes through the stay insertion hole 52. Accordingly, the board 5 is supported by the engagement portions 254a, 255a and the poles 259 therebetween. Thus, the board 5 and solenoid valves 2 are fixed together in a co-moving manner as a single body.

Then, the coil wire 24 is electrically connected with the board 5 through the cap 261. Therefore, it is possible to stably keep a robust conduction between the coil wire 24 and the board 5.

Fourteenth Embodiment

Figure 35:
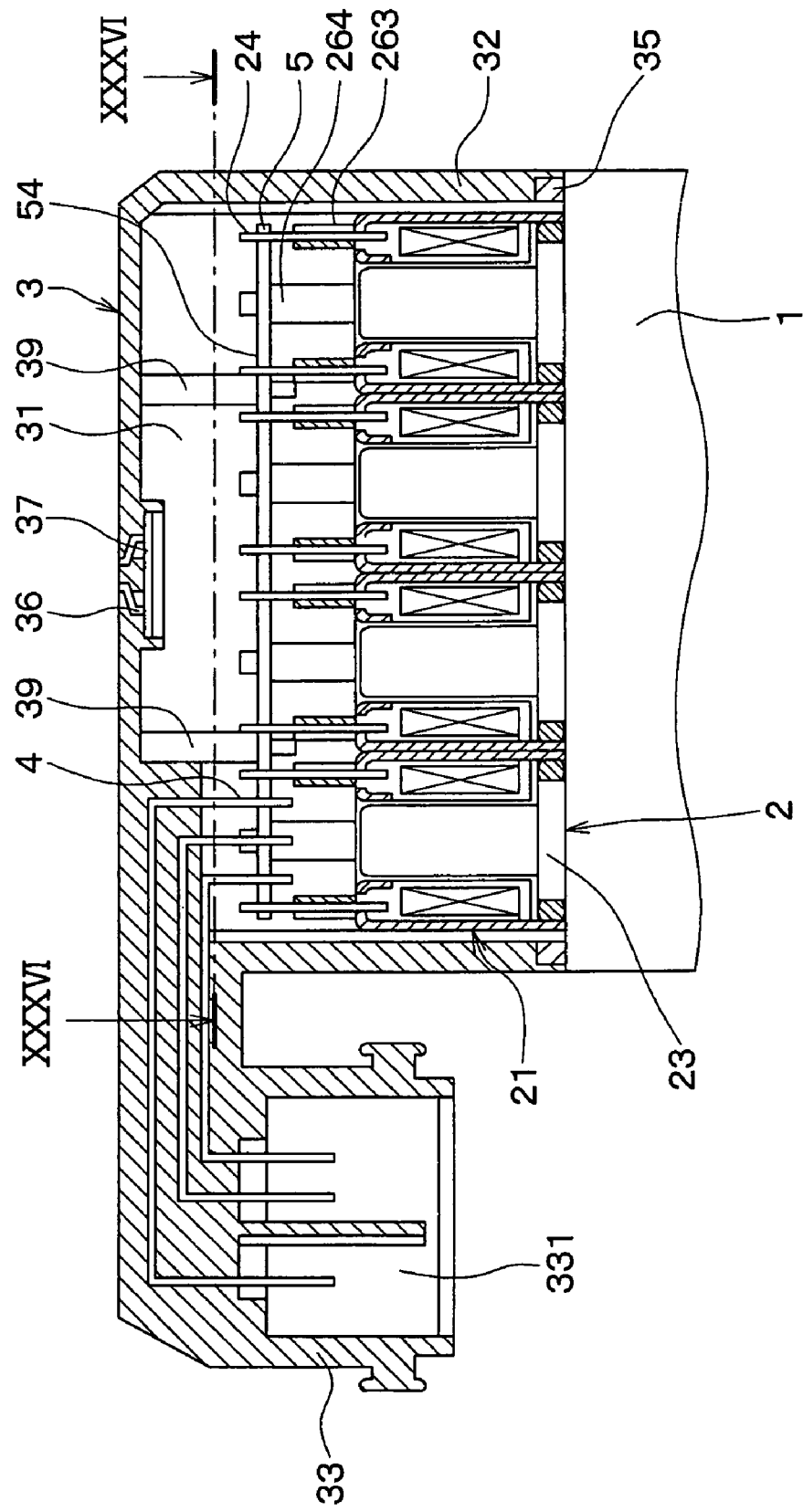
FIG. 35 is a cross-sectional view of a main part of a fluid pressure control device according to a fourteenth embodiment of the present invention.
Figure 36:
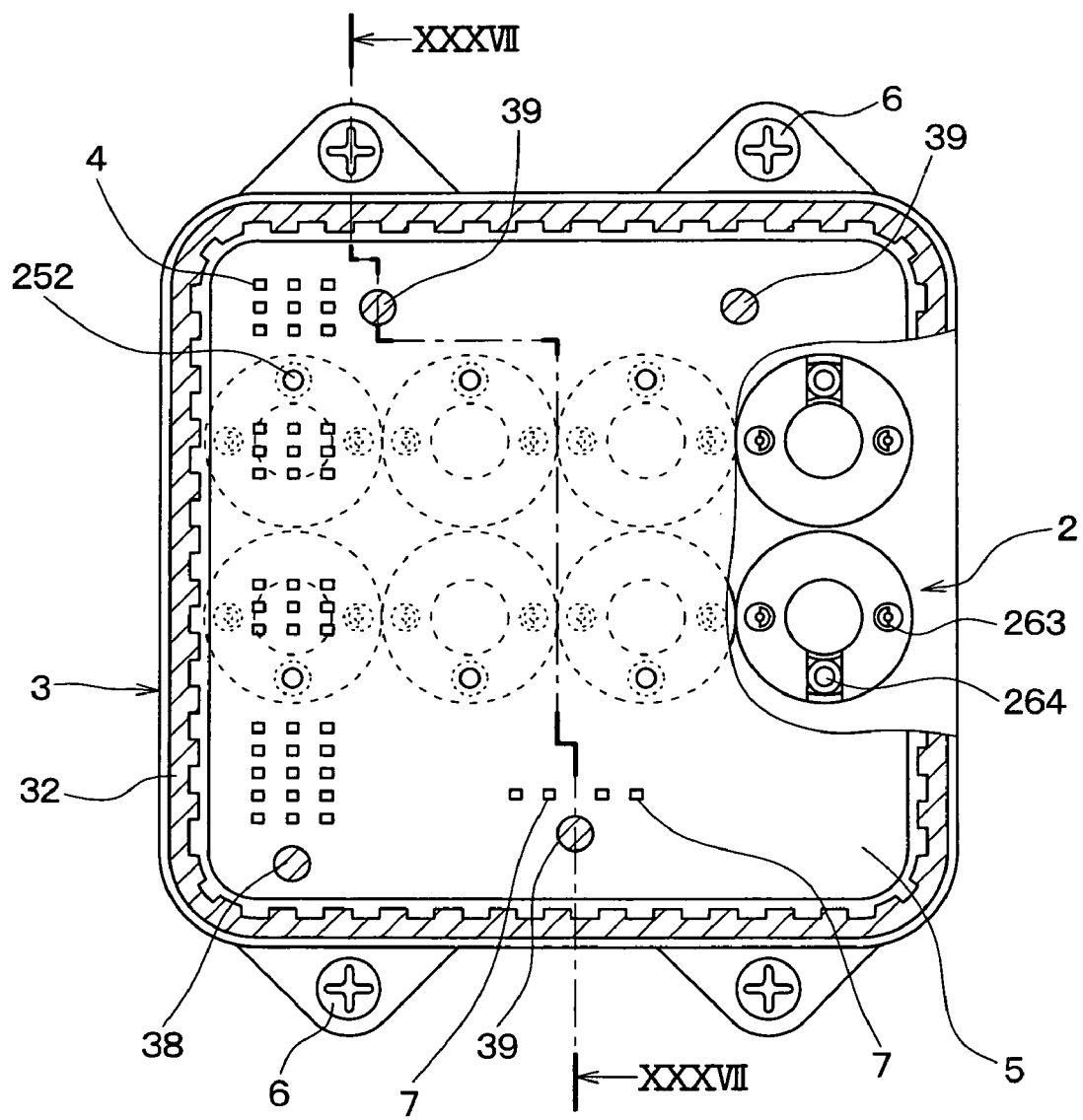
FIG. 36 is a cross-sectional view taken along the XXXVI-XXXVI line in FIG. 35.
Figure 37:
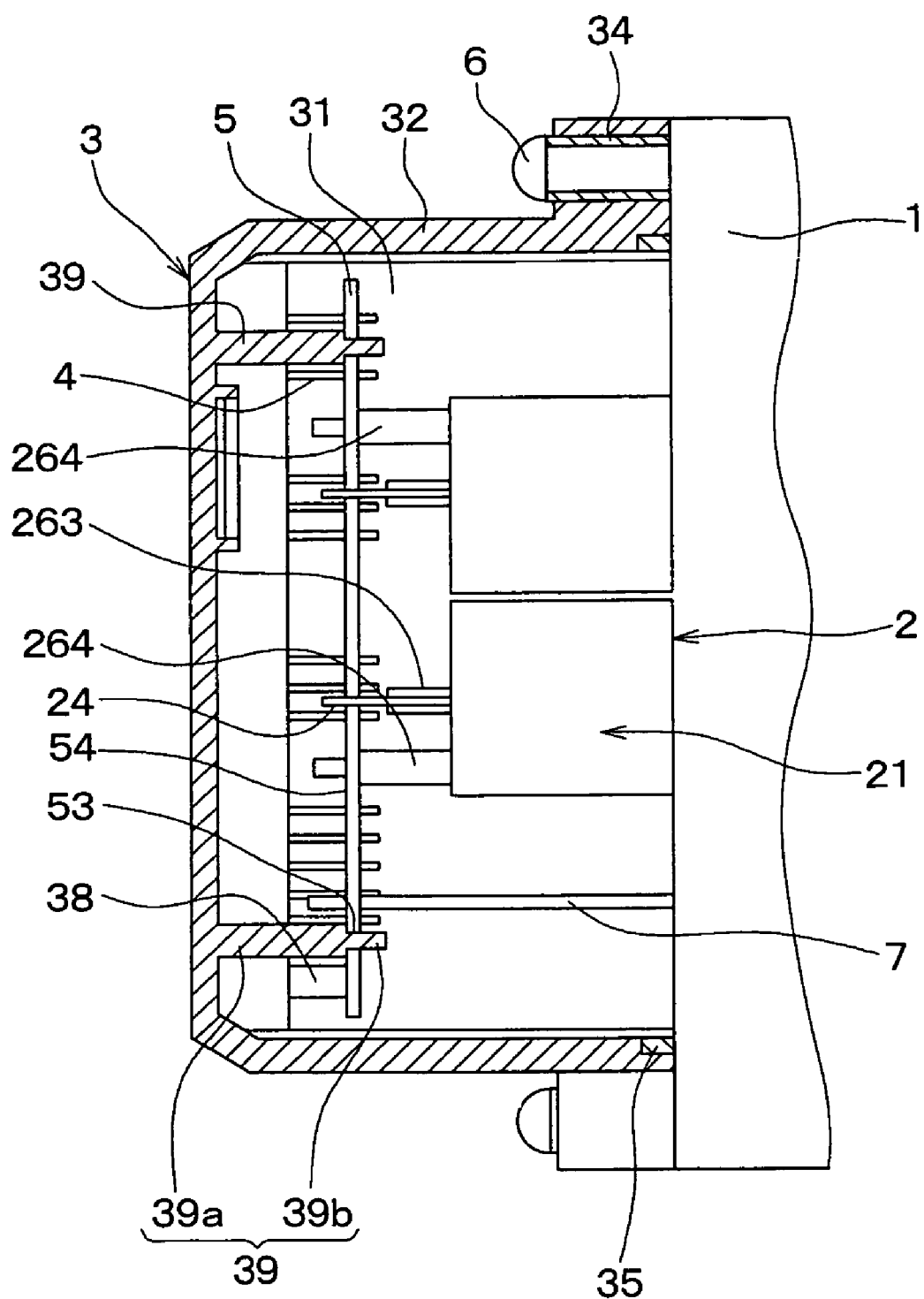
FIG. 37 is a cross-sectional view taken along the XXXVII-XXXVII line in FIG. 36.
Figure 38:
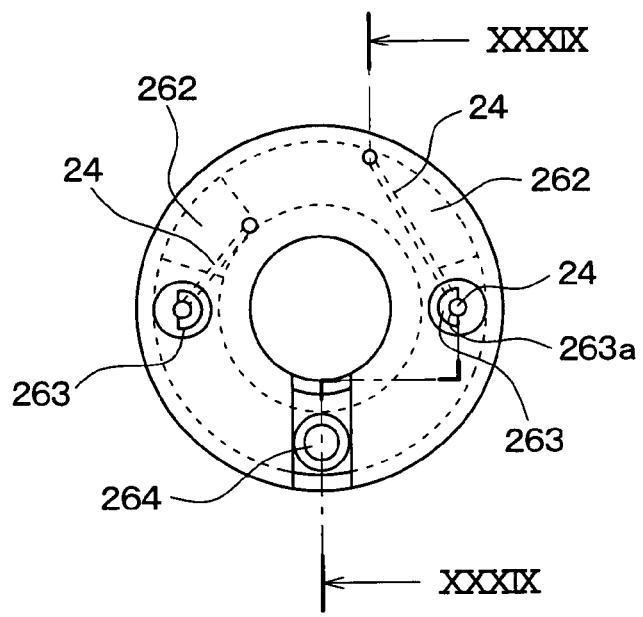
FIG. 38 is a plan view of a solenoid shown in FIG. 35.

Hereinafter, a fourteenth embodiment of the present invention is described with reference to FIGS. 35 and 39.

In the present embodiment, the way the solenoids 21 are connected with the board 5 is different from that of the second embodiment. More specifically, the solenoid terminals 22 and the first stay 252 in the second embodiment are disused, and the coil wires 24 are used to fix the board 5 to the solenoids 21 in direct contact with the solenoids 21 in a co-moving manner as a single body. A part shown in this embodiment is identical or equivalent to a part in the second embodiment if the same reference numeral is applied to the two parts. Descriptions for such a part are omitted in this embodiment.

As shown in FIGS. 35 to 39, at each of all bobbins 25 of all the solenoid valves 2, a pair of guide grooves 262 each forming a slit is formed, and a pair of guide portions 263 protruding toward the board 5 is also formed. Each of the guide portions 263 has a semicircular cross section. At each of the guide portions 263, a semicircular groove 263a extending in the direction parallel to the axis of the corresponding solenoid valve 2 is formed at a planar surface portion of the guide portion 263.

The coil wire 24 goes through the guide grooves 262 and is then fitted in the groove 263a, with a tip of the coil wire 24 protruding from the guide portions 263. Thus, a rising portion of the coil wire 24 is reinforced, wherein the rising portion is a portion of the coil wire 24 at which the coil wire 24 starts rising toward the board 5. The coil wire 24 is plated at its portion within a range X in FIG. 39 so that the portion is reinforced. The portion includes a portion located in the guide groove 262 and the groove 263a and a portion protruding from the guide portions 263. After arranging the coil wire 24 as described above, heated liquid like plastic is poured into the guide groove 262 and the outer periphery 258 of the bobbin 25.

A pole 264 is formed at every one of the bobbin 25 of all of the solenoid valves 2. The pole 264 protrudes toward the board 5 and having a stepped columnar shape. The pole 264 includes a columnar thick pole portion 264a and a columnar thin pole portion 264b. The thin pole portion 264b protrudes from an end of the thick pole portion 264a and extends toward the board 5. The outer diameter of the thick pole portion 264a is sufficiently larger than the diameter of a corresponding one of pole insertion holes 55 formed at the board 5. The diameter of the thin pole portion 264b is slightly smaller than the corresponding pole insertion hole 55.

In the present embodiment, the each of the thin pole portions 264b is inserted to the corresponding pole insertion hole 55 as well as an end of each of the coil wires 24 is inserted to a corresponding one of holes 56 formed at the board 5. Then each of the ends of the coil wires 24 is soldered with the board 5.

Since the thin pole portions 264b are loosely fitted to the pole insertion holes 55, the poles 264 do not serve as means for fixing the board 5 to the solenoids 21 in a co-moving manner as a single body and for integrally supporting the board 5. The poles 264 serve as a means for preventing the solenoids 21 swinging. By means of the coil wire 24, the board 5 is fixed to and supported by the solenoids 21 in direct contact with the solenoids 21 in a co-moving manner as a single body.

According to the present embodiment, it is possible to reduce the manufacturing cost of the fluid pressure control device compared to the instance that the solenoid terminals 22 are used so that the board 5 are fixed to an supported by the solenoid 21 in direct contact with the solenoid 21 in a co-moving manner as a single body, since the solenoid terminals 22 can be disused.

In the present embodiment, the solenoids 21 are not fixed to the body 1. However, the method for connecting the solenoids 21 with the board 5 described in the present embodiment can be applied to an instance that the solenoids 21 are fixed to the body 1 by caulking as described in the first embodiment.

Fifteenth Embodiment

Figure 40:
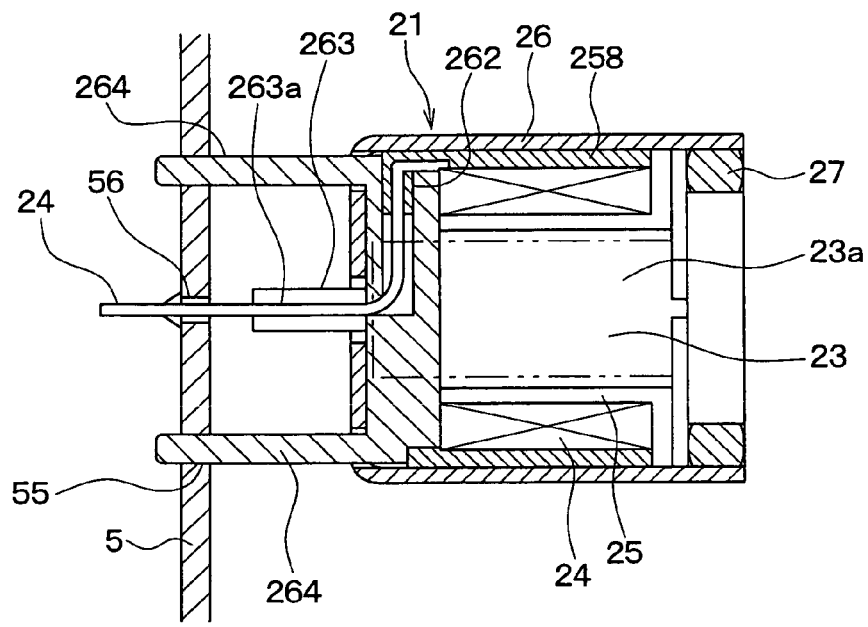
FIG. 40 is a cross-sectional view of a main part of a solenoid valve used for a fluid pressure control device according to a fifteenth embodiment of the present invention.

Hereinafter, a fifteenth embodiment of the present invention is described with reference to FIG. 40. A part shown in this embodiment is identical or equivalent to a part in the fourteenth embodiment if the same reference numeral is applied to the two parts. Descriptions for such a part are omitted in this embodiment.

In the fourteenth embodiment, every one of the solenoid valves 2 includes the stepped columnar pole 264 in order to prevent the solenoids 21 from swinging. In contrast, as shown in FIG. 40, in the present embodiment, every one of the solenoid valves 2 includes two non-stepped columnar poles 264 each of which has a columnar shape without steps. A tip end of each of the poles 264 is inserted to the corresponding pole insertion hole 55 for prevention of swinging of the solenoids 21.

Sixteenth Embodiment

Figure 41:
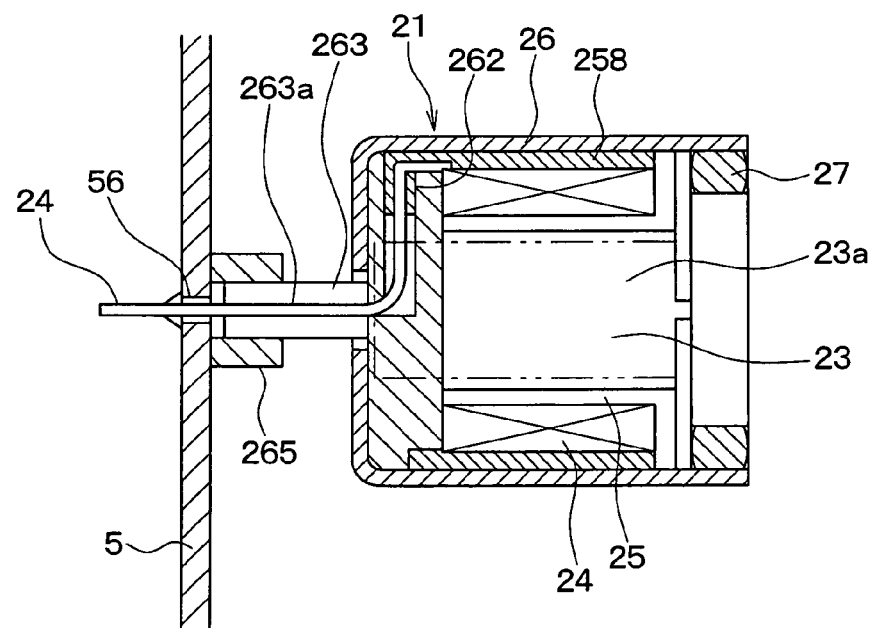
FIG. 41 is a cross-sectional view of a main part of a solenoid valve used for a fluid pressure control device according to a sixteenth embodiment of the present invention.

Hereinafter, a sixteenth embodiment of the present invention is described with reference to FIG. 41. A part shown in this embodiment is identical or equivalent to a part in the fourteenth embodiment if the same reference numeral is applied to the two parts. Descriptions for such a part are omitted in this embodiment.

In the fourteenth embodiment, every one of the solenoid valves 2 includes the stepped columnar pole 264 in order to prevent the solenoids 21 from swinging. In contrast, as shown in FIG. 41, in the present embodiment, holding members 265 each having a cylindrical shape are attached to the board 5 by bonding or the like. Tip sides portions of the guide portions 263 of the solenoid valves 2 are inserted respectively to the holding members 265 for prevention of swinging of the solenoids 21.

Seventeenth Embodiment

Figure 42:
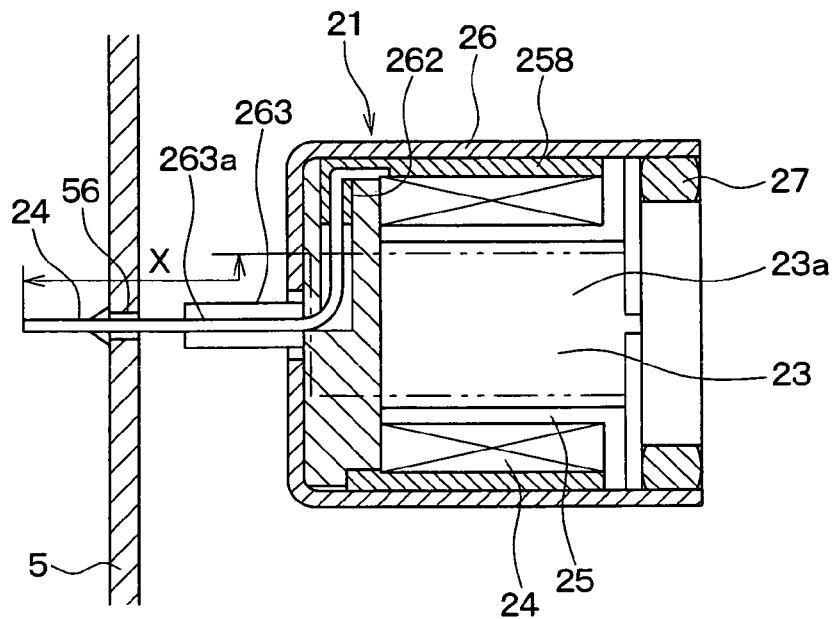
FIG. 42 is a cross-sectional view of a main part of a solenoid valve used for a fluid pressure control device according to a seventeenth embodiment of the present invention.

Hereinafter, a seventeenth embodiment of the present invention is described with reference to FIG. 42. A part shown in this embodiment is identical or equivalent to a part in the fourteenth embodiment if the same reference numeral is applied to the two parts. Descriptions for such a part are omitted in this embodiment.

Figure 39:
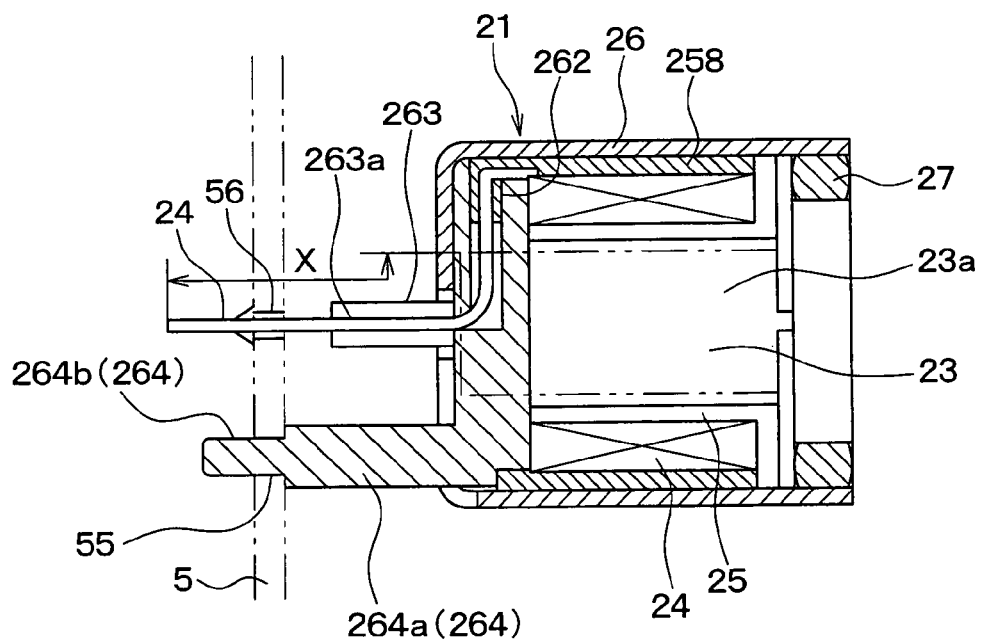
FIG. 39 is a cross-sectional view taken along the XXXIX-XXXIX line in FIG. 38.

In the fourteenth embodiment, each of the coil wires 24 is plated at its portion within a range X shown in FIG. 39 so that the portion is reinforced. In contrast, in the present embodiment, each of the coil wires 24 is doubly plated at its portion within the same range X shown in FIG. 42 so that the portion is reinforced furthermore. Thus, the pole 264 becomes unnecessary and it is possible to make the bobbin 25 to have a simpler structure.

The double plating can be made by means of the first plating with a kind of material and the subsequent plating with the same kind of material. Otherwise, the double plating can be made by means of the first plating (i.e. base plating) with material (for example, nickel) for reinforcement and the subsequent plating (i.e. surface plating) with conductive material (for example, tin or solder).

Eighteenth Embodiment

Figure 43:
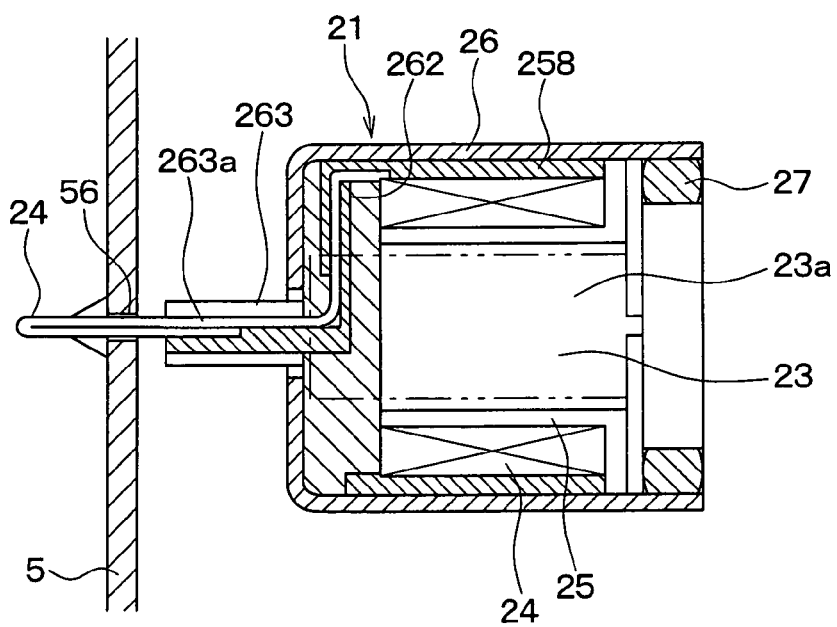
FIG. 43 is a cross-sectional view of a main part of a solenoid valve used for a fluid pressure control device according to an eighteenth embodiment of the present invention.

Hereinafter, an eighteenth embodiment of the present invention is described with reference to FIG. 43. A part shown in this embodiment is identical or equivalent to a part in the fourteenth embodiment if the same reference numeral is applied to the two parts. Descriptions for such a part are omitted in this embodiment.

In the fourteenth embodiment, each of the coil wires 24 is plated at its portion within a range X shown in FIG. 39 so that the portion is reinforced. In contrast in the present embodiment, as shown in FIG. 43, each of the coil wires 24 is turned down at a portion protruding from the corresponding groove 263a of the guide portions 263. In addition, the tip of the coil wire 24 is inserted to the groove 263a again. Thus, it is possible to reinforce a portion of the coil wire 24 protruding from the groove 263a of the guide portions 263. As a result, the pole 264 becomes unnecessary and the bobbin 25 can be made with a simpler structure.

After arranging the coil wire 24 as described above, heated liquid like plastic can be poured into the groove 263a.

Nineteenth Embodiment

Figure 44:
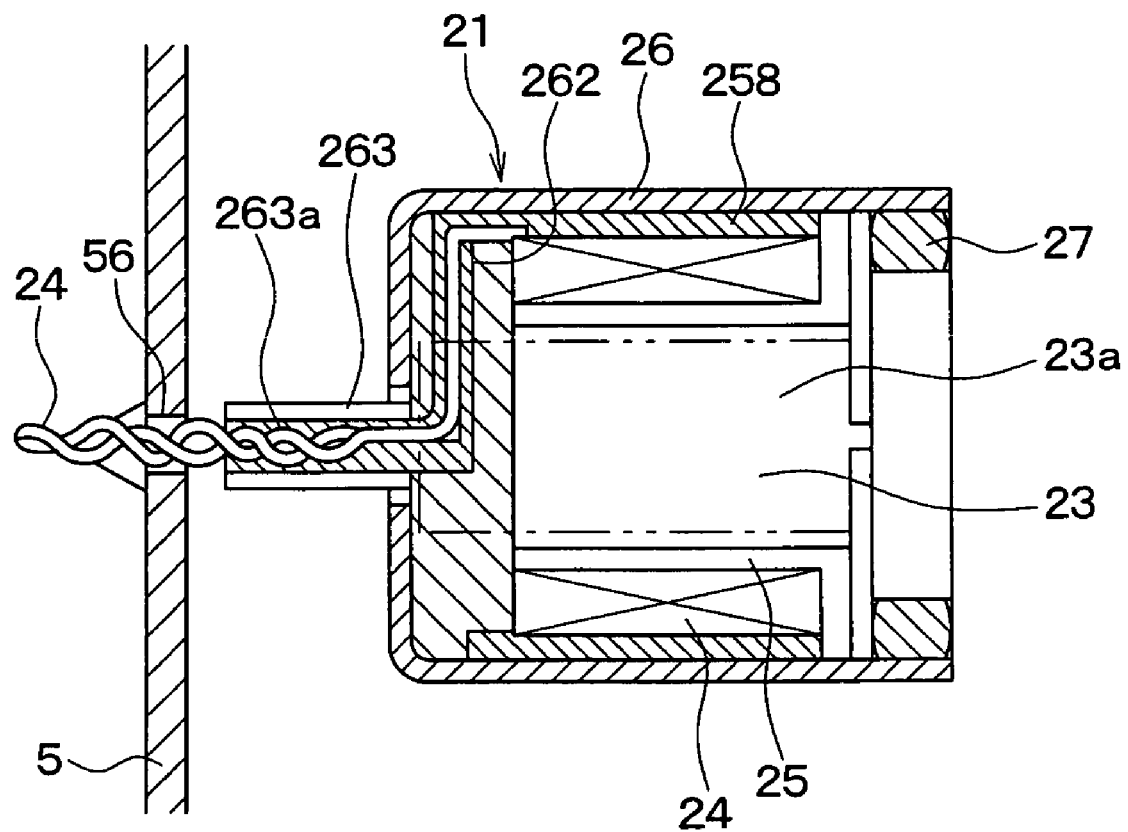
FIG. 44 is a cross-sectional view of a main part of a solenoid valve used for a fluid pressure control device according to a nineteenth embodiment of the present invention.

Hereinafter, a nineteenth embodiment of the present invention is described with reference to FIG. 44. A part shown in this embodiment is identical or equivalent to a part in the fourteenth embodiment if the same reference numeral is applied to the two parts. Descriptions for such a part are omitted in this embodiment.

In the fourteenth embodiment, each of the coil wires 24 is plated at its portion within a range X shown in FIG. 39 so that the portion is reinforced. In contrast in the present embodiment, as shown in FIG. 44, each of the coil wires 24 is turned down and twisted (or entangled) at a portion protruding from the corresponding groove 263a of the guide portions 263. In addition, the tip of the coil wire 24 is inserted to the groove 263a again. Thus, it is possible to reinforce a portion of the coil wire 24 protruding from the groove 263a of the guide portions 263. As a result, the pole 264 becomes unnecessary and the bobbin 25 can be made with a simpler structure.

After arranging the coil wire 24 as described above, the groove 263a of the guide portions 263 can be molded by resin.

Twentieth Embodiment

Hereinafter, a twentieth embodiment of the present invention is described with reference to FIG. 45 to 47. A part shown in this embodiment is identical or equivalent to a part in the seventeenth embodiment if the same reference numeral is applied to the two parts. Descriptions for such a part are omitted in this embodiment.

Figure 45:
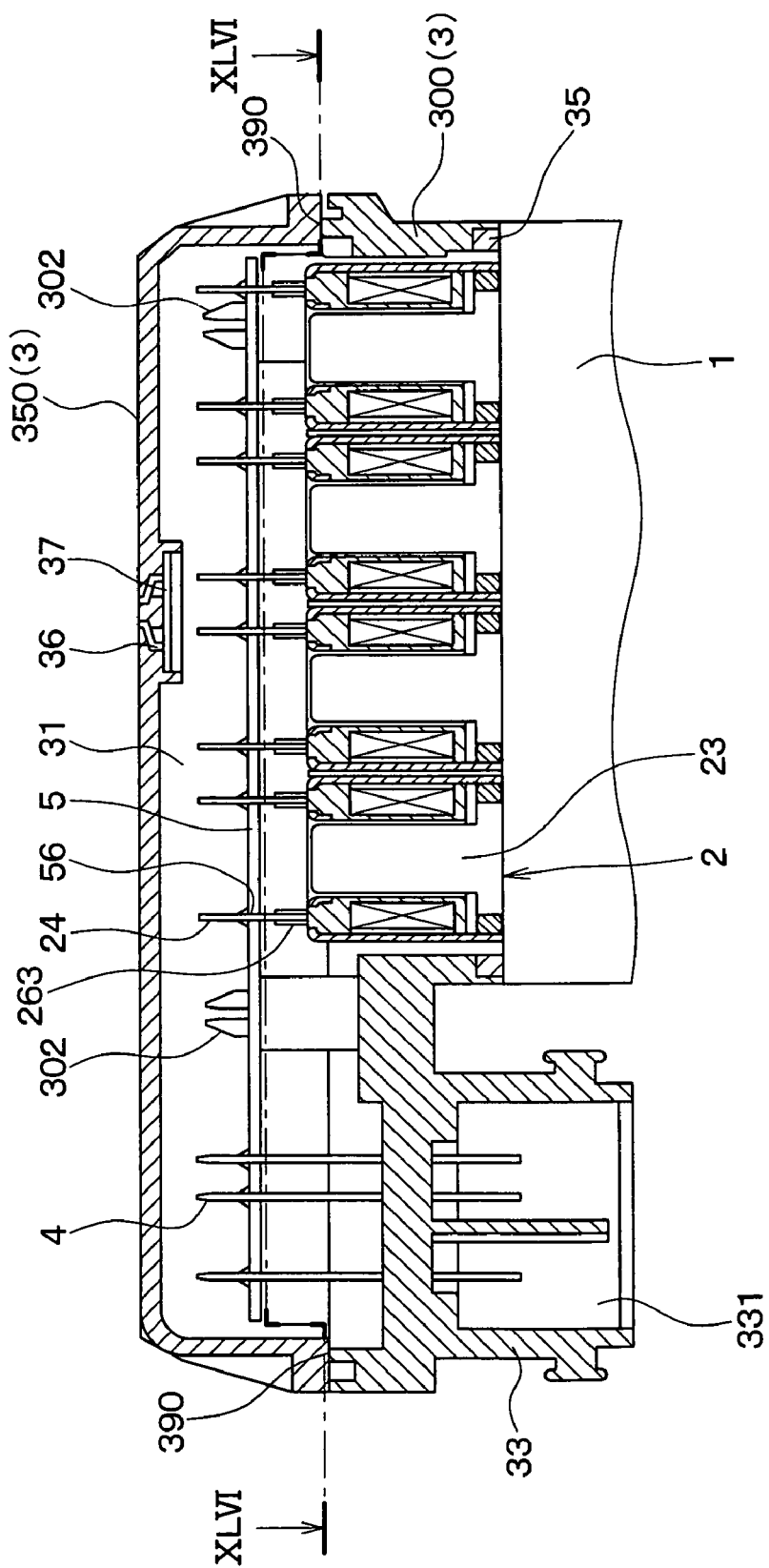
FIG. 45 is a cross-sectional view of a main part of a solenoid valve used for a fluid pressure control device according to a twentieth embodiment of the present invention.
Figure 46:
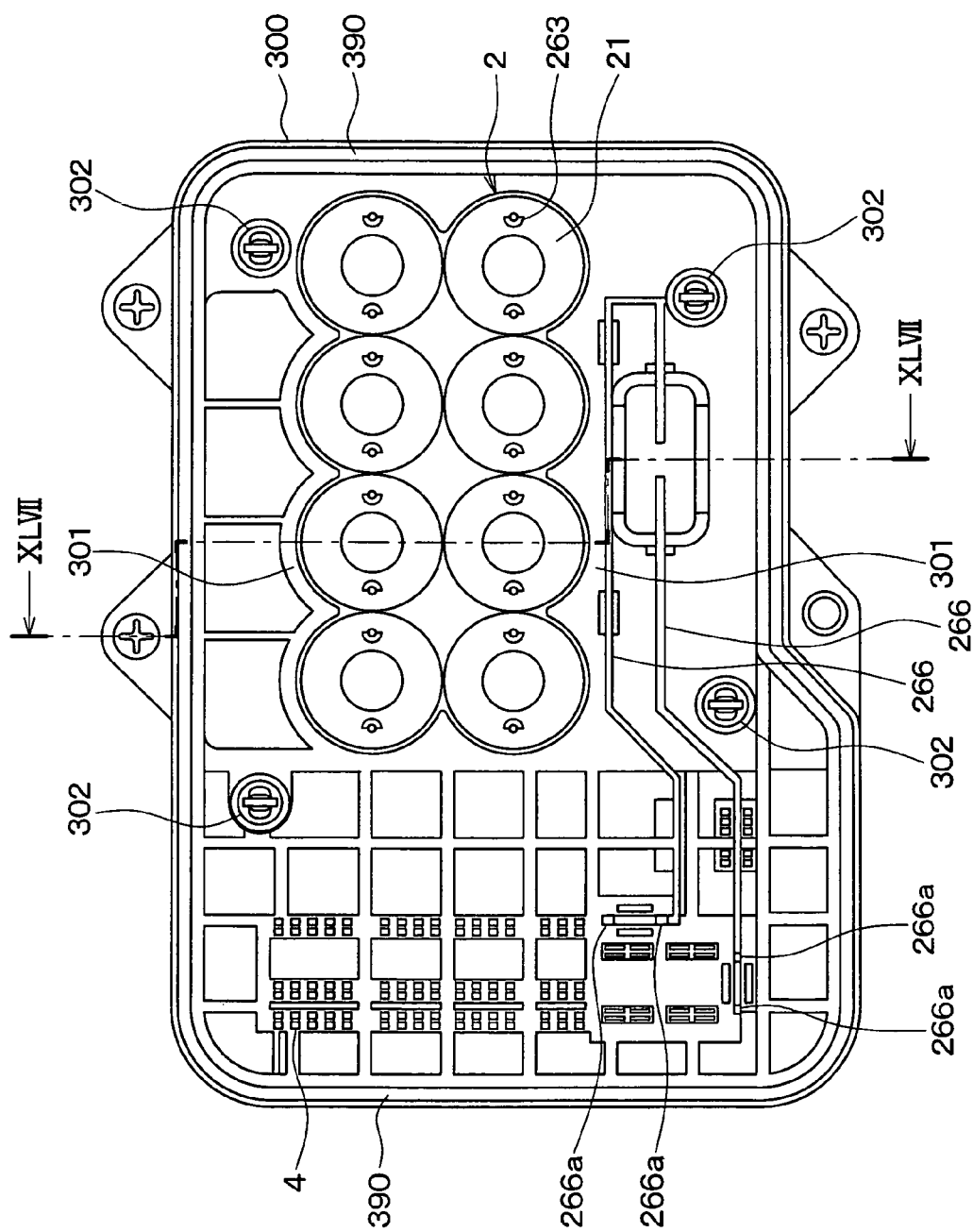
FIG. 46 is a cross-sectional view taken along the XLVI-XLVI line in FIG. 45.
Figure 47:
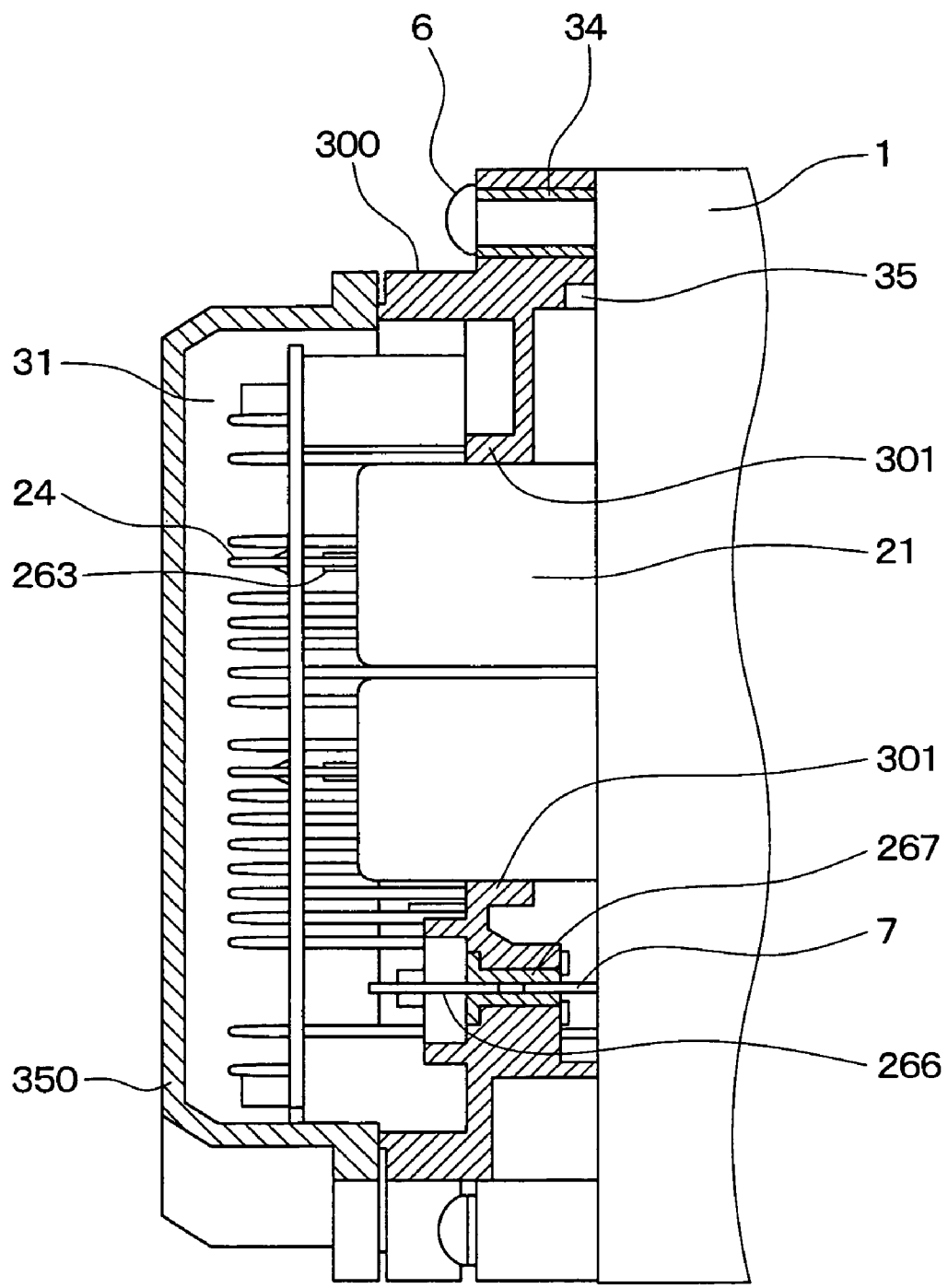
FIG. 47 is a cross-sectional view taken along the XLVII-XLVII line in FIG. 46.
Figure 48:
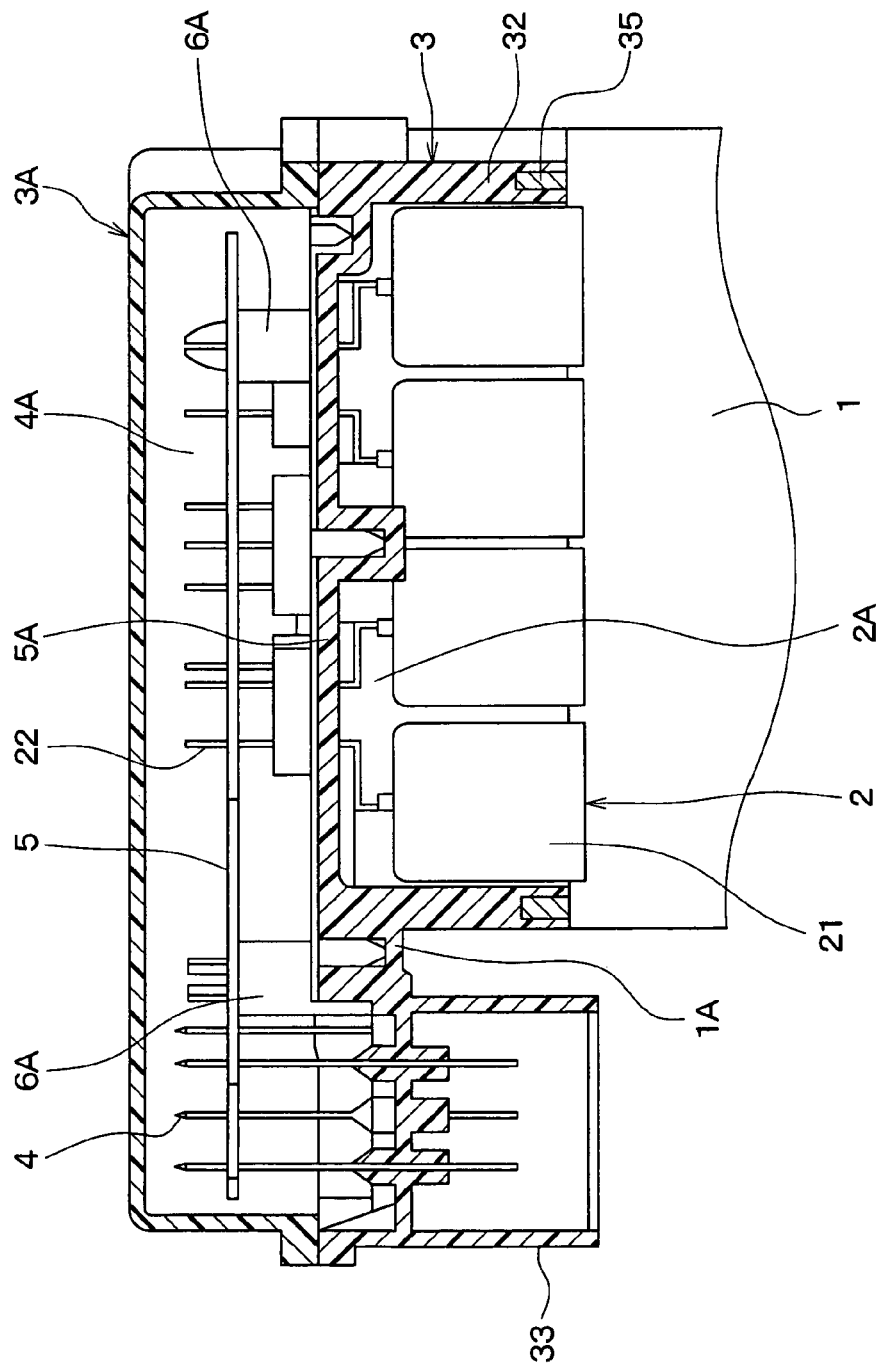
FIG. 48 is a cross-sectional view of a main part of a fluid pressure control device according to a prior art.
Figure 49:
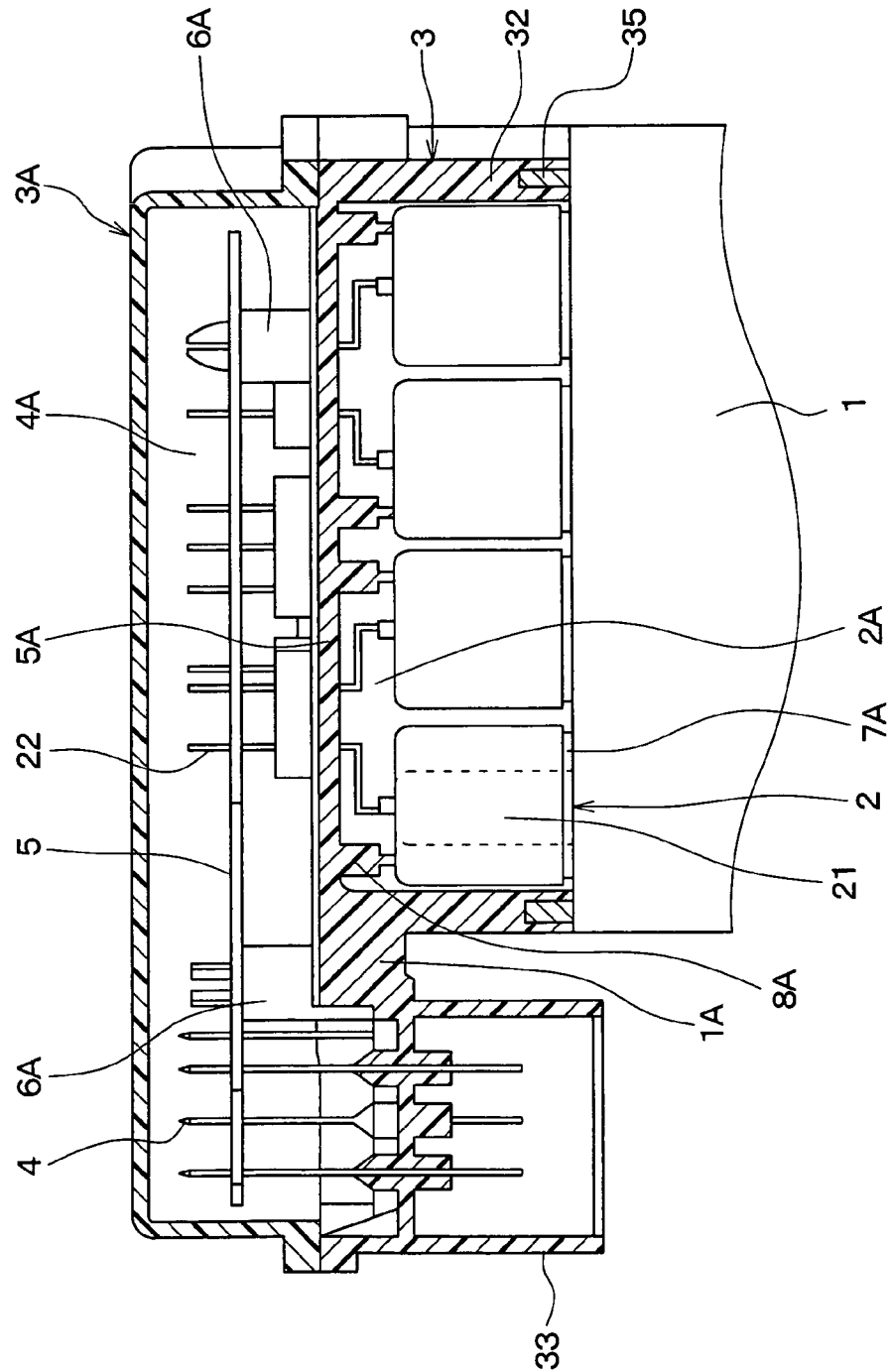
FIG. 49 is a cross-sectional view of a main part of a fluid pressure control device according to another prior art.

As shown in FIGS. 45 to 47, the case 3 includes a main unit 300 to be mounted on the body 1 and a cover portion 350 for covering an open end of the main unit 300, wherein the open end is opposite to the other open end of the main unit 300 opening toward the body 1. The chamber 31 is formed by the main unit 300 and the cover portion 360.

Bushes 34, a lot of connector terminals 4, and busbars 266 are formed in the main unit 300 by insert molding. The main unit 300 includes guide portions 301 and board holding portions 302. The guide portions 301 are in contact with the outer peripheral surface of the solenoids 21 to support the solenoids 21. The board holding portions 302 support a board collective described below. Besides, an inner connector 267 to which the motor terminal 7 and GND terminal are inserted is attached to the main unit 300.

The fluid pressure control device having the above structure is constructed as follows. First, the valve units 23 of solenoid valves 2, the pump (not shown) and the motor and the like are attached to the body 1. At this time, the body 1 is caulked so that the valve units 23 are integrally fixed to the body 1 in direct contact with the body 1 in a co-moving manner as a single body.

After top ends of the coil wires 24 are inserted to the corresponding holes 56 of the board 5, each of the top ends of the coil wires 24 are soldered with the board 5. Thus, a board collective is formed in which the solenoids 21 are fixed to the board 5 in direct contact with the board 5 in a co-moving manner as a single body.

Subsequently, the board collective is attached to the board holding portions 302. At this time, the solenoids 21 are inserted to the guide portions 301 as well as the connector terminals 4 and terminals 266a of the busbars 266 are inserted into the board 5. After each of the terminals 4 and 266a are soldered with the board 5, an ECU assembly is constructed by welding the main unit 300 and the cover portion 350 together at a contact surface 390 where the a surface portion of the main unit 300 and a surface portion of the cover portion 350 meets with each other. In the ECU assembly, the guide portions 301 prevent the solenoids 21 from swinging.

Then, the ECU assembly is fixed to the body 1. At this time, the solenoids 21 are externally fitted to the sleeves 23a of the valve units 23 at the peripheries of the sleeve 23a. In addition, the motor terminal 7 and the GND terminal are inserted to the inner connector 267.

In the present embodiment, the main unit 300 and the cover portion 350 are put together after each of the connector terminals 4 and the busbar terminals 266a is soldered together with the board 5. Therefore, soldering can be done in a simple manner.

The solenoid valves 2 each having the pole 264 as shown in the fifteenth embodiment can be used for prevention of the swinging of the solenoids 21.

Other Embodiments

In the above embodiments, the fluid pressure control device is used for the vehicular brake device. The present invention can be applied to a fluid pressure control device used for other purposes.

The first stays 252 and 253 may be integrally formed with the corresponding bobbins 25 or separately formed from the corresponding bobbins 25. In the case that the first stays 252 and 253 are separately formed from the corresponding bobbins 25, the first stays 252 and 253 may be made of metal such as iron based material and aluminum based material, in place of resin. If the first stays 252 and 253 are made of material having a thermal expansion coefficient smaller than that of the above mentioned resin, it is possible to reduce a stress generated under heat load at contact portions between the solenoid terminals 22 and board 5.

As for the fluid pressure control devices in the eighth embodiment and the ninth embodiment, the connector housing 33 can be located, as described in the fifth embodiment (see FIG. 12), at a place facing the board surface 54 of the board 5 with their mouth opening in the direction opposite to the board 5.

What is claimed is:

1. A fluid pressure control device comprising:
a body in which fluid flows;
a solenoid valve including a valve unit and a solenoid, the valve unit allowing and blocking flow of the fluid, the solenoid including a coil wire, the solenoid being externally fitted to the valve unit in a detachable manner;
a case in which an unpartitioned chamber is formed, the case installed to the body, the case further includes:
a case stay formed in the chamber integrally with the case, the case stay protruding toward the board; and
an opening which is in contact with and covered by the body;
a board located in the chamber, the board having a surface on which an electrical element is arranged; and a connector terminal connected with the board, the connector terminal to be connected with an external connector at an outside of the case;

wherein:

the coil wire is connected with the board directly or indirectly;

the solenoid is fixed to the board in a co-moving manner, the board is fixed to the case in a co-moving manner;

the valve unit is fixed to the body in a co-moving manner;

the solenoid and the board are located in the chamber;

an end portion of the connector terminal is fixed to the case in a co-moving manner and protrudes, along with the case stay, away from an inner wall of the chamber toward the opening; and each of the end portion of the connector terminal and the case stay is inserted into the board in a direction of protrusion thereof.

2. The fluid pressure control device according to claim 1, further comprising:

a solenoid terminal which is stiffer than the coil wire, the solenoid terminal having an end connected with the coil wire and another end connected with the board, wherein:

the case stay is used so that the board is connected with the case in a co-moving manner; and the solenoid terminal is used so that the solenoid is fixed to the board in a co-moving manner.

3. The fluid pressure control device according to claim 1, wherein:

the solenoid includes a bobbin and a solenoid stay, the solenoid stay integrally formed with the bobbin and the first stay protruding toward the board;

the solenoid stay is used so that the solenoid is connected with the board in a co-moving manner; and the case stay is used so that the board is connected with the case in a co-moving manner.

4. The fluid pressure control device according to claim 3, wherein the coil wire extends along the solenoid stay to the board and is thereby connected with the board.

5. The fluid pressure control device according to claim 1, wherein:

the coil wire is directly attached to the board; and the coil wire is used so that the solenoid is fixed to and supported by the board in a co-moving manner.

6. The fluid pressure control device according to claim 5, wherein the solenoid includes a guide portion integrally formed with the bobbin, the guide portion protruding toward the board and supporting the coil wire.

7. The fluid pressure control device according to claim 1, wherein the case includes a main unit and a cover portion, wherein the main unit is attached to the body and includes an open end formed at an end of the main unit farther from the body, and the cover portion covers the open end.

8. The fluid pressure control device according claim 1, wherein the fluid pressure control device is incorporated to a vehicle and is used for a brake device of the vehicle.

9. The fluid pressure control device according to claim 1, wherein the connector terminal is formed while inserted in an interior of a wall of the case, the wall being around the chamber.

* * * * *